(12) United States Patent
Kompella

(10) Patent No.: US 8,009,674 B2
(45) Date of Patent: *Aug. 30, 2011

(54) TRANSPORT NETWORKS SUPPORTING VIRTUAL PRIVATE NETWORKS, AND CONFIGURING SUCH NETWORKS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,925

(22) Filed: Oct. 27, 2009

(65) Prior Publication Data

US 2010/0046526 A1 Feb. 25, 2010

Related U.S. Application Data

(63) Continuation of application No. 11/519,110, filed on Sep. 11, 2006, now Pat. No. 7,620,069, which is a continuation of application No. 09/865,050, filed on May 24, 2001, now Pat. No. 7,136,374.

(60) Provisional application No. 60/277,112, filed on Mar. 19, 2001.

(51) Int. Cl.
*H04L 12/56* (2006.01)
(52) U.S. Cl. .................................. 370/392; 370/395.53
(58) Field of Classification Search .................. 370/401, 370/395.53, 397, 399, 395.3, 392, 469
See application file for complete search history.

(56) References Cited

U.S. PATENT DOCUMENTS

| | | | |
|---|---|---|---|
| 6,735,190 B1 * | 5/2004 | Chuah et al. .................. 370/352 |
| 2002/0129271 A1 * | 9/2002 | Stanaway et al. ............. 713/201 |
| 2003/0030662 A1 * | 2/2003 | Poisson et al. ................ 345/735 |
| 2003/0088699 A1 * | 5/2003 | Luciani et al. ................ 709/243 |
| 2004/0202171 A1 * | 10/2004 | Hama ........................ 370/395.1 |
| 2005/0088977 A1 * | 4/2005 | Roch et al. .................... 370/254 |

* cited by examiner

*Primary Examiner* — Brian D Nguyen
(74) *Attorney, Agent, or Firm* — John C. Pokotylo; Straub & Pokotylo

(57) ABSTRACT

A layer 2 transport network, and components thereof, supporting virtual network functionality among customer edge devices. Virtual private network configuration can be accomplished with merely local intervention by preprovisioning extra channel (or circuit) identifiers at each customer edge device and by advertising label base and range information corresponding to a list of channel (or circuit) identifiers.

14 Claims, 17 Drawing Sheets

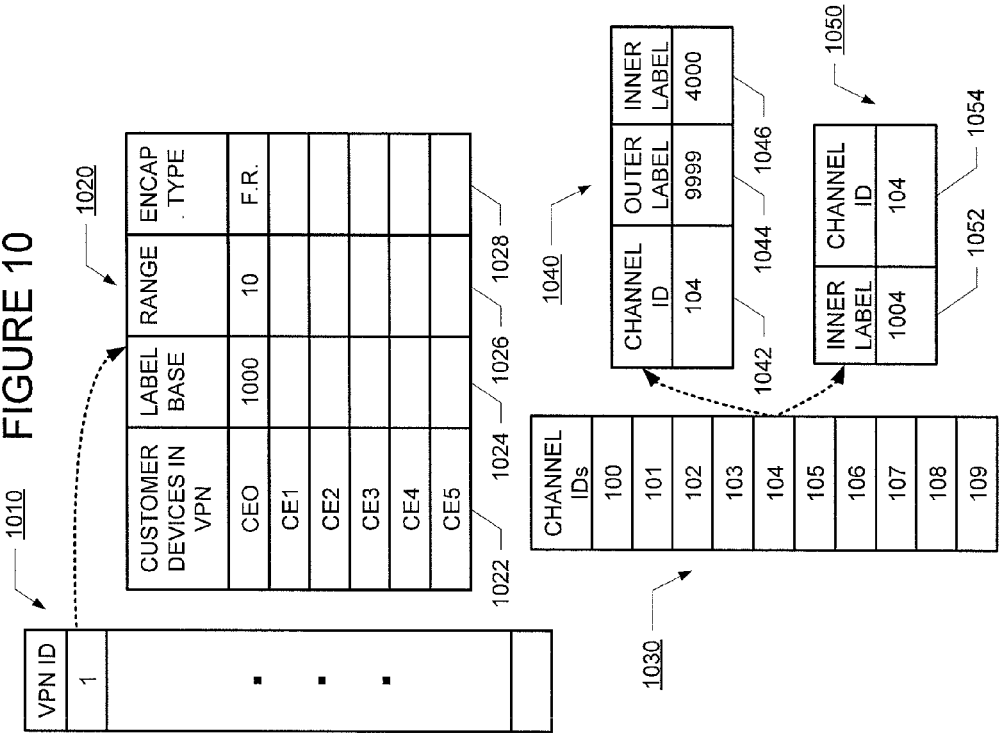

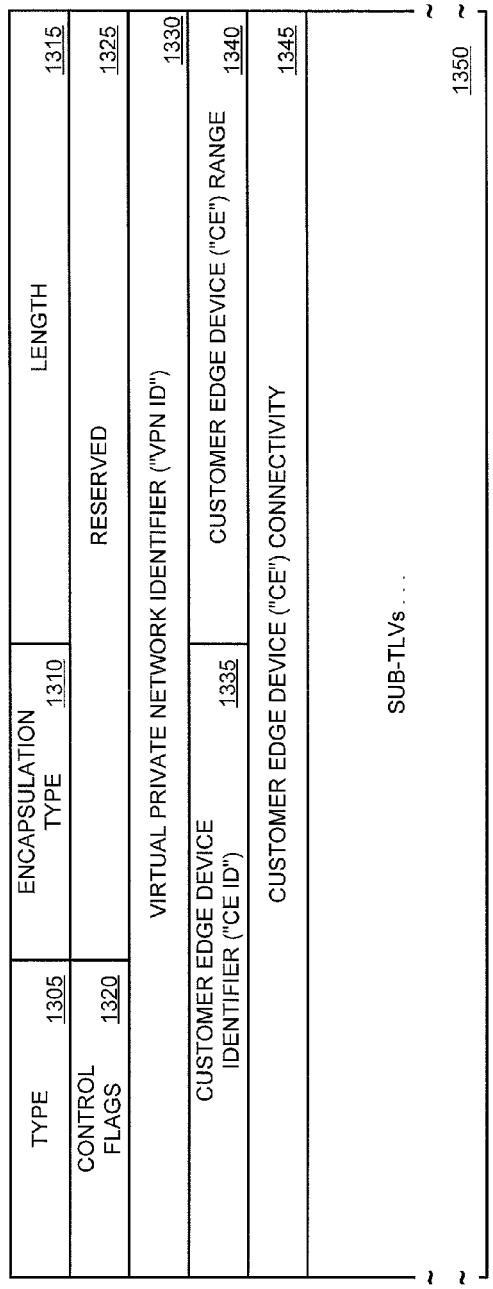
FIGURE 13
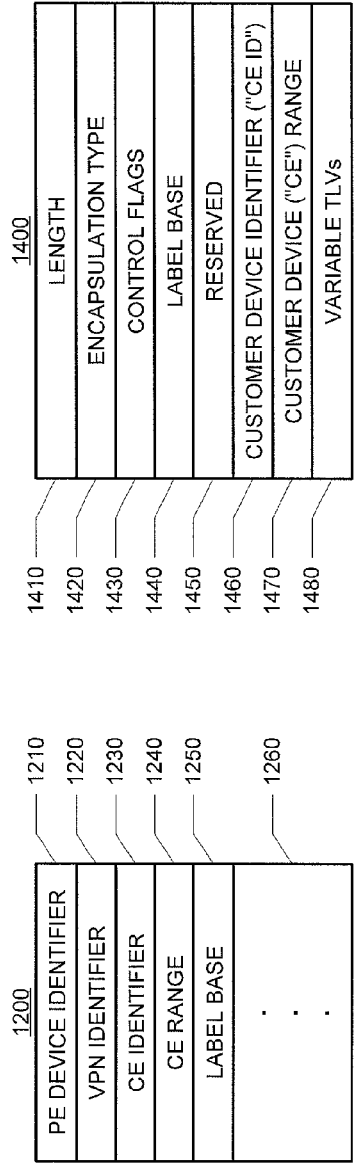
FIGURE 14
FIGURE 12

TRANSPORT NETWORKS SUPPORTING VIRTUAL PRIVATE NETWORKS, AND CONFIGURING SUCH NETWORKS

§0. RELATED APPLICATIONS

The present application is a continuation of U.S. patent application Ser. No. 11/519,110 (referred to as "the '110 application" and incorporated herein by reference), filed on Sep. 11, 2006, titled "TRANSPORT NETWORKS SUPPORTING VIRTUAL PRIVATE NETWORKS, AND CONFIGURING SUCH NETWORKS" and listing Kireeti KOMPELLA as the inventor, which issued as U.S. Pat. No. 7,620,069 on Nov. 17, 2009, and which is a continuation of U.S. patent application Ser. No. 09/865,050 (referred to as "the '050 application" and incorporated herein by reference), filed on May 24, 2001, titled "TRANSPORT NETWORKS SUPPORTING VIRTUAL PRIVATE NETWORKS, AND CONFIGURING SUCH NETWORKS," listing Kireeti KOMPELLA as the inventor, which issued as U.S. Pat. No. 7,136,374 on Nov. 14, 2006, and which claims the benefit of U.S. Provisional Patent Application Ser. No. 60/277,112 (incorporated herein by reference), filed on Mar. 19, 2001 and titled "TRANSPORT NETWORKS SUPPORTING VIRTUAL PRIVATE NETWORKS AND CONFIGURING SUCH NETWORKS."

§1. BACKGROUND OF THE INVENTION

§1.1. Field of the Invention

The present invention concerns methods, apparatus and data structures for providing a transport network that supports virtual private networks. The present invention also concerns configuring such a network.

§1.2. Related Art

The description of art in this section is not, and should not be interpreted to be, an admission that such art is prior art to the present invention.

§1.2.1 Known Private Networking Technologies

For many entities (such as businesses, universities, etc.), local area networks (or "LANs") suffice for intra-entity communications. Indeed, LANs are quite popular since they are relatively inexpensive to deploy, operate, and manage, and are based on mature, well-developed technology (e.g., Ethernet). Unfortunately, however, most entities need to communicate (voice and/or data) with their own facilities, or others, beyond their immediate location. Thus, wide area networks (or "WANs") are needed. Very often, entities want at least some privacy or security attached to their communications.

Presently, private long-haul communications can take place over networks that can be generally classified into two types—dedicated WANs that facilitate communications among multiple sites, and public transport networks that allow one or more sites of a private network to communicate. Both of these types of networks are introduced below.

§1.2.1.1 Dedicated WANs

Dedicated wide area networks ("WANs") are typically implemented using leased lines or dedicated circuits to connect multiple sites. Customer premise equipment ("CPE") routers or switches at theses sites connect these leased lines or dedicated circuits together to facilitate connectivity between each site of the network. Most private networks with a relatively large number of sites will not have "fully meshed" networks (i.e., direct connections between each of the sites) due to the cost of leased lines or dedicated circuits and to the complexity of configuring and managing customer premises equipment. Rather, some form of hierarchical network topology is typically employed in such instances. Dedicated WANs are relatively expensive and typically require the customer to have some networking expertise.

§1.2.1.2 Virtual Private Networks

Public transport networks, which are typically deployed by regional bell operating companies (or "RBOCs"), or some other service provider, are often used to allow remote users to connect to an enterprise network using the public-switched telephone network (or "PSTN"), an integrated services digital network (or "ISDN"), or some other type of transport network technology. (Note that the word "public" in the phrase "public transport network" connotes the fact that more than one entity may use it, even though it may be privately owned and managed, and not available to the general public.) Such remote access may be facilitated by deploying network access servers (or NASs) at one or more central cites. When users connect to (e.g., dial into) a NAS, it works with authentication, authorization and accounting (or "AAA") servers to verify the identity of the user and to check which services that user is authorized to use.

§1.2.2 Limitations of Known Transport Network Technologies

As can be appreciated, private dedicated WANs are beyond the financial reach of most entities. Accordingly, so-called public transport networks have become quite popular. Unfortunately, however, various incompatible public transport networks have been introduced over the years in response to the then perceived needs to support various applications. Examples of such public transport network technologies include switched multimegabit data service ("SMDS"), X.25 packet switched networks, frame relay, broadband ISDN, and asynchronous transport mode ("ATM").

The fact that public transport networks use incompatible technologies has two onerous implications for service providers. First, technologies with which customers access the transport network (referred to as "access technologies") must be compatible with the technology used in the transport network (unless there is a handoff between networks, which is expensive). Thus, customers are locked into a technology from end-to-end. Further, as illustrated in FIG. 1, such dependencies between access technologies and transport network technologies have forced public transport network service providers to support, maintain and administer 120 separate networks 110.

Second, various applications and potential applications of communications networks, such as voice, video-on-demand, audio-on-demand, e-mail, voice-mail, video conferencing, multicasting, broadcasting, Internet access, billing, authorization, authentication, and accounting, caching, fire-walling, etc., have different network requirements, such as requirements related to maximum permissible latency, data loss, delay jitter, bandwidth, network security, etc. Consequently, customers are expected to demand various levels of service offered at various prices. Unfortunately, some of the above-referenced public transport network technologies cannot support all of the aforementioned applications. For example, they may not offer adequate bandwidth, security, and/or adequate quality of service measures to support the aforementioned applications. Even if the various public transport network technologies did provide such quality of service support, supporting various service levels and types, globally, across a number of different transport networks greatly exacerbates the problem of supporting multiple networks.

§1.2.3 Layer 3 Virtual Private Networks and their Perceived Limitations

Layer 3 virtual private networks have been proposed. See, e.g., E. Rosen et. al., "BGP/MPLS VPNs," *RFC* 2547, The Internet Society (March 1999), and B. Gleeson et al., "A Framework for IP Based Virtual Private Networks," *RFC 2764*, The Internet Society (February 2000). Generally, layer 3 VPNs ("IPVPN" in particular) offer a good solution when the customer traffic is wholly IP, customer routing is reasonably simple, and the customer sites connect to the service provider with a variety of layer 2 technologies. Unfortunately, however, layer 3 VPNs have a number of perceived disadvantages. Some of these perceived disadvantages are introduced below.

First, a misbehaving customer edge device ("CE") in a layer 3 VPN can flap its routes, leading to instability of the service provider's edge ("PE") router or even the entire service provider network. To combat this potential problem, the service provider may aggressively damp route flaps from a CE. This is common enough with external border gateway protocol ("BGP") peers, but in the case of VPNs, the scale of the problem is much larger. Also, if the CE-PE routing protocol is not BGP, it will not have BGP's flap damping control.

Second, with layer 3 VPNs, special care has to be taken that routes within the traditional VPN are not preferred over the Layer 3 VPN routes (often referred to as the "backdoor routing" problem). One known solution (See, e.g., *RFC 2764*) to this problem requires protocol changes that are somewhat ad hoc.

Third, if the service provider were participating in customer routing, it would be vital that the customer and service provider both use the same layer 3 protocol(s) and routing protocols.

Fourth, with layer 3 VPNs, each CE in a VPN may have an arbitrary number of routes that need to be carried by the service provider. This fact raises two challenges. First, both the information stored at each PE and the number of routes installed by the PE for a CE in a VPN can be (in principle) unbounded. Thus, in practice, a PE must restrict itself to installing routes associated with the VPNs that it is currently a member of. Second, a CE can send a large number of routes to its PE. Consequently, the PE should protect itself against such a condition. Thus, the service provider may enforce limits on the number of prefixes accepted from a CE. This in turn requires the PE router to offer such control.

Thus, an alternative public transport network is needed. Such a public transport network should (i) support the provision of virtual private network functions, (ii) isolate the transport network from incompetent or malicious actions by customers, (iii) minimize the number of routes that need to be stored on the service provider's routers, and/or (iv) support multicasting.

§2 SUMMARY OF THE INVENTION

The invention may provide a method for processing ingress data by an edge device of a transport network by (a) determining a first label and a second label based on layer 2 destination information of the ingress data, (b) adding the first and second labels to the data to generate modified data, and (c) using the first label to forward the modified data towards an egress edge device of the transport network, where the second label is to be used by the egress edge device to associate the ingress data with a destination device and a channel (or circuit). In one embodiment, the destination information of the ingress data is removed. In one embodiment, the modified data may be encapsulated.

The destination information of the ingress data may be represented by a logical identifier. The logical identifier may be associated with a unique virtual private network. The logical identifier and the virtual private network may be used to determined the egress edge device associated with the first label. Similarly, the logical identifier and the virtual private network may be used to determined the destination device and channel (or circuit) associated with the second label.

The present invention may also provide a method for processing egress data, having a first label and a second label, by an edge device of a transport network, by (a) determining a channel (or circuit) to a destination customer edge device based on the second label, and (b) forwarding the egress data on the channel (or circuit) determined. In one embodiment, the second label was derived from an identifier of the destination customer edge device, and a label base of a source customer edge device. The second label may have been mapped from a channel (or circuit) identifier for the destination customer edge device used by the source customer edge device. The channel (or circuit) identifiers for the destination customer devices used by the source customer edge device and the destination customer edge device may be different.

The present invention may also provide a method for generating, by a transport network edge device, information about a newly added customer edge device belonging to a virtual private network, to be disseminated to other edge devices of the transport network, by (a) obtaining a label base value and a range value associated with the newly added customer edge device, and (b) generating at least one message, the at least one message collectively including (i) a first field for identifying the transport network edge device, (ii) a second field for identifying the virtual private network to which the newly added customer edge device belongs, (iii) a third field for identifying the newly added customer edge device, (iv) a fourth field for identifying the range value; and (v) a fifth field for identifying the label base.

The present invention may also provide a method for processing, by a first transport network edge device, information about a newly added customer edge device belonging to a virtual private network. For a second customer edge device, belonging to the virtual private network and attached to the first transport network edge device, the method may (a) determine a first label for getting to a second transport network edge device sourcing the information about the newly added customer edge device, (b) determine a second label for reaching the newly added customer edge device from the second transport network device, (c) determine a third label for data from the newly added customer edge device to reach the second customer edge device from the first transport network edge device, (d) determine a first route mapping an identifier of the newly added customer edge device, used by the second customer edge device, to the first label and the second label, and (e) determine a second route mapping the third label to a channel (or circuit) identifier of the second customer edge device. In one embodiment, the information about a newly added customer edge device belonging to a virtual private network may include (i) a first value identifying the second transport network edge device, (ii) a second value identifying the virtual private network, (iii) a third value identifying the newly added customer edge device, (iv) a fourth value identifying a range associated with the newly added customer edge device, and (v) a fifth value identifying a label base associated with the newly added customer edge device.

The act of determining a second label for reaching the newly added customer edge device from the second transport network edge device may include determining a function of a label base of the newly added customer edge device and a value derived from an identifier of the second customer edge device. The act of determining a third label for data from the newly added customer edge device to reach the second customer edge device may include determining a function of a label base of the second customer edge device and a value derived from the identifier of the newly added customer edge device. The range associated with the newly added customer edge device may correspond to a number of elements in a list of channel (or circuit) identifiers provisioned at the newly added customer edge device.

The present invention may also provide apparatus to perform the foregoing methods, as well as data structures used by or generated from the foregoing methods.

§3. BRIEF DESCRIPTION OF THE DRAWINGS

FIG. 9 illustrates information, for use by the present invention, that may be stored at a customer edge device.

FIG. 10 illustrates information, for use by the present invention, that may be stored at a service provider edge device.

FIGS. 12 through 14 illustrate various types of advertisements for signaling a newly added customer edge device.

§4. DETAILED DESCRIPTION

The present invention involves novel methods, apparatus and data structures for providing a transport network that supports the provision of virtual private networks, as well as methods, apparatus and data structures for configuring such a transport network. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the invention may operate is described in §4.1. Then, high-level applications that may be performed by the present invention are introduced in §4.2. Thereafter, operations related to those high-level applications, as well as apparatus, methods and data structures that may be used to effect those high level applications, are described in §4.3. Thereafter, examples of packet forwarding, and network configuration, are provided in §4.4. Finally, some conclusions regarding various aspects of the present invention are provided in §4.5.

§4.1 EXEMPLARY ENVIRONMENT IN WHICH THE PRESENT INVENTION MAY OPERATE

Figure 1:
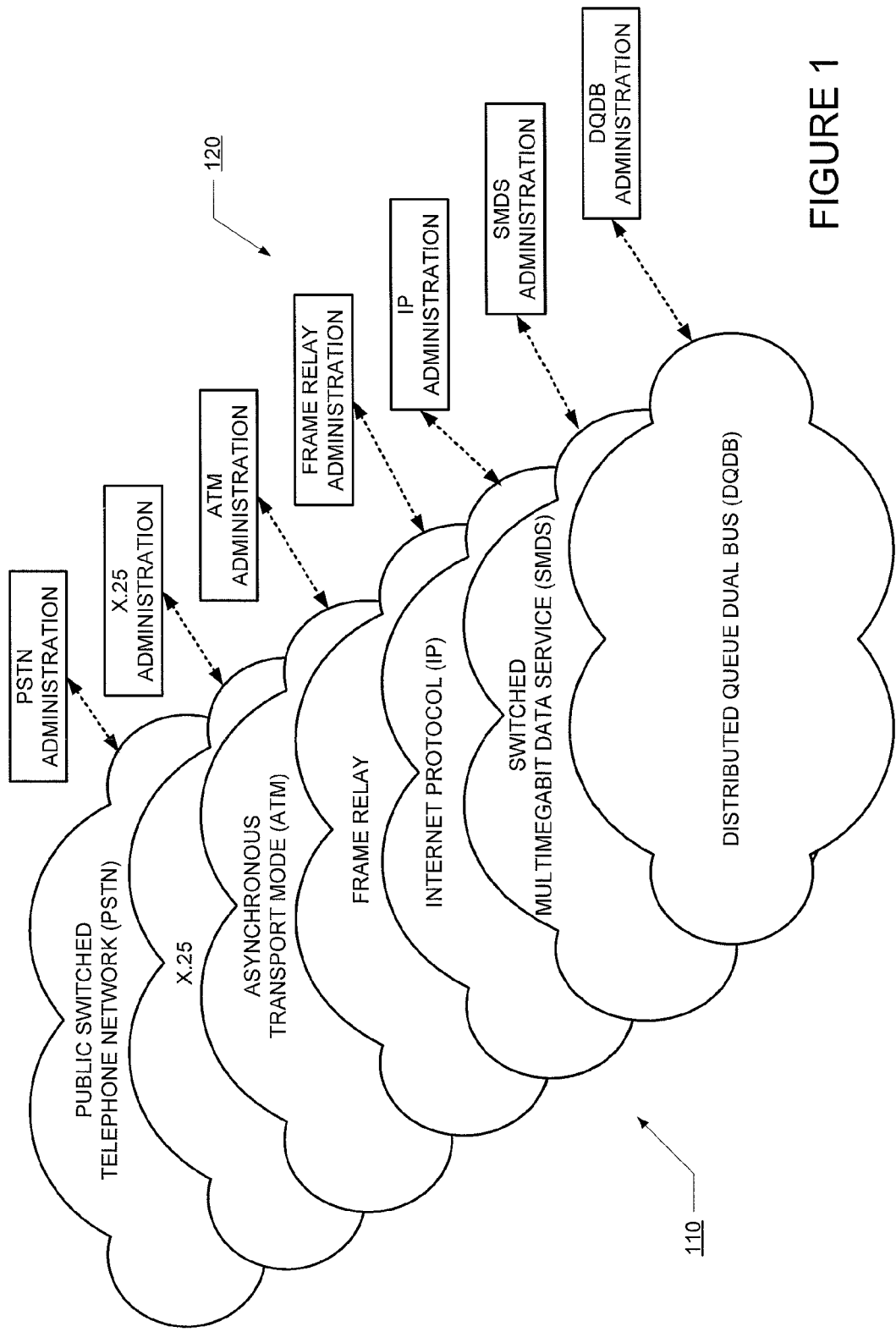
FIG. 1 illustrates the problem of administering various transport networks using different technologies.
Figure 2:
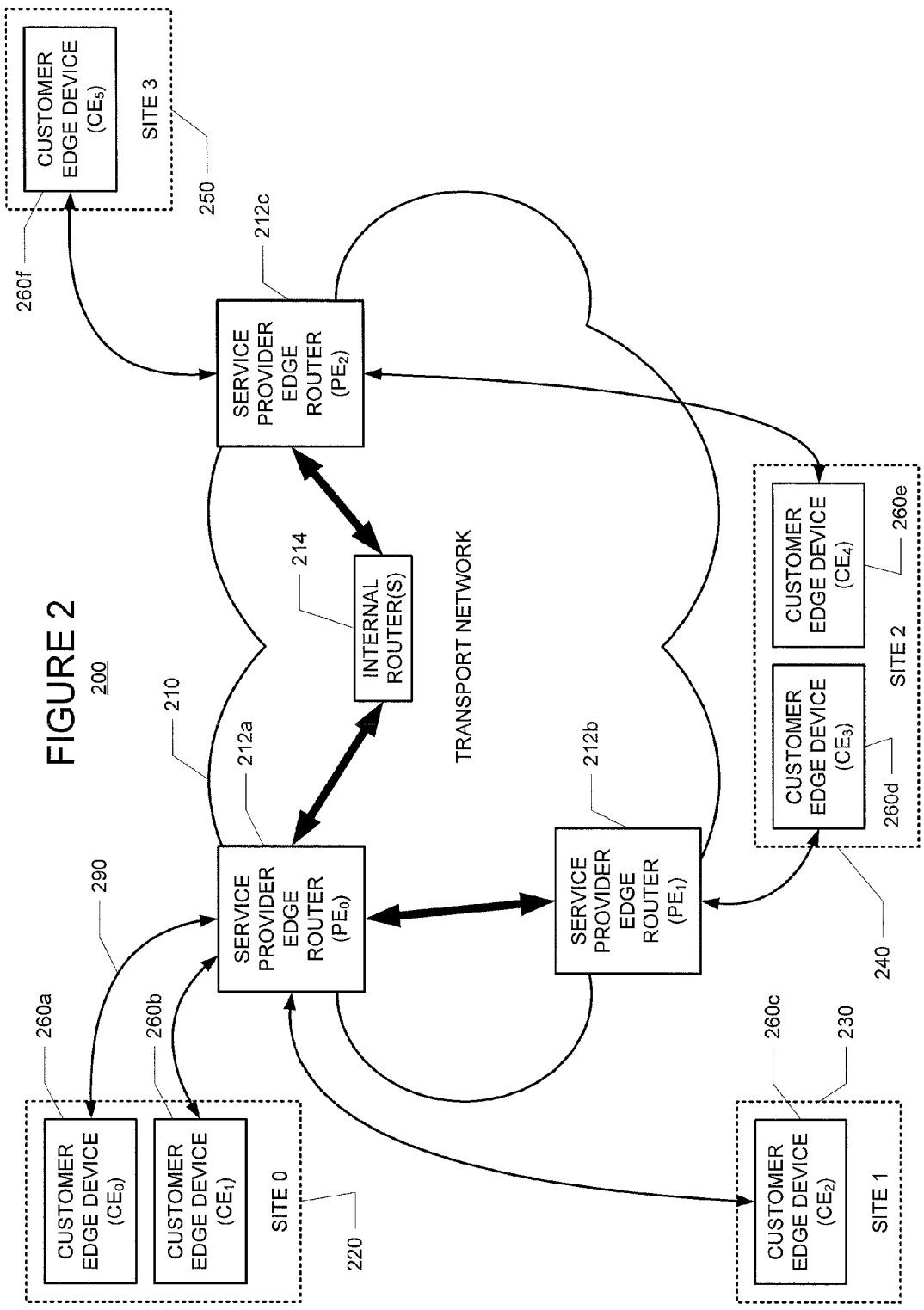
FIG. 2 illustrates an environment in which the present invention may be used.

FIG. 2 illustrates an exemplary environment 200 in which the present invention may operate. A service provider may operate a transport network 210 for use by a customer having multiple sites 220, 230, 240, 250. Each of the customer sites may have a one or more hosts coupled with the transport network 200 via a customer edge ("CE") device 260. The customer edge device may, in turn, be coupled with a service provider edge ("PE") device 212, such as a router for example. Internal nodes 214, such as routers, may be used to permit communications between various service provider edge devices 212 of the transport network 210.

It is assumed that the transport network 210 is a so-called layer 2 transport network. For example, the transport network 210 may be a label-switching network, such as a multi-protocol label switching ("MPLS") network. The present invention may help service providers to (i) isolate their transport network from their customers, and (ii) clearly demarcate customer and service provider responsibilities.

The service provider may separate its responsibilities from those of its customers such that the service provider is responsible for layer 2 connectivity; the customer is responsible for layer 3 connectivity, which includes routing. If the customer says that host x in site 0 220 cannot reach host y in site 1 230, the service provider need only demonstrate that site 0 220 is connected to site 1 230. The details of how routes for host y reach host x are the customer's responsibility.

Once a PE provides layer 2 connectivity to its connected CE, it has discharged its responsibility. A misbehaving CE can at worst flap its interface. (A misbehaving CE in a layer 3 VPN can flap its routes, leading to instability of the PE router, or even the entire SP network. This means that the service provider may have to aggressively damp route flaps from a CE in a layer 3 VPN.)

§4.2 HIGH-LEVEL APPLICATIONS THAT MAY BE PERFORMED BY THE INVENTION

As described below, a high-level application of the present invention may be to provide data transport. It may do so by providing a transport network that can support virtual private networks. Finally, a high level-application of the present invention may be to facilitate the configuration of the transport network. Such configuration may involve purely local intervention. Non-local intervention may be performed automatically, by the transport network.

§4.2.1. Data (Packet) Transport

The present invention may use channel (or circuit) identifiers to communicate data between client edge devices (CEs) and service provider edge devices (PEs). The present invention may use a layer 2 transport technology, such as label-switched paths (e.g., defined using MPLS), to communicate data between service provider edge devices (PEs) in a transport network.

§4.2.2 Support Virtual Private Networks

The present invention may support virtual private networks ("VPNs"). As stated in §1.2.3 above, private dedicated wide area networks ("WANs") are beyond the financial reach of most entities. Accordingly, public transport networks have become quite popular. VPNs can provide customers with most or all of the features of private networks, at a greatly reduced cost. However, addressing and security challenges arise when providing VPN services.

First, regarding addressing, a transport network service provider cannot ensure that layer 3 addresses are globally unique. That is, different customers may use overlapping layer 3 addresses—this is simply beyond the control of the transport network service provider. The present invention may provide a VPN service with globally unique addressing, notwithstanding the fact that different customers may have overlapping addresses. The present invention may do so by permitting different customer edge devices (CEs) to be identified with a VPN to which they belong, and to uniquely, within a VPN, address such CEs.

§4.2.3 Network Configuration

Virtual private networks ("VPNs") may be configured on a transport network by providing forwarding information regarding each customer edge device (CE) within a VPN to service provider edge devices (PEs) servicing at least one CE within the VPN. Unfortunately, however, such configuration is challenging. To avoid the need to make global changes to configuration information each time a new customer device (CE) is added to a VPN, the present invention may permit each customer edge device (CE) of a VPN to be configured locally at its associated service provider edge device (PE). The present invention may do so by signaling, to all other service provider edge devices in the VPN, an identifier of the service provider edge device, an identifier of the VPN, an identifier of the customer edge device (CE), a label base, and a channel (or circuit) range. Service provider edge devices (PEs) receiving such signaling may then provision "channels" or "routes" to map a channel (or circuit) identifier to a first label (used to get data from an ingress service provider edge device to an egress service provider edge device, and referred to as an "outer label" without loss of generality in the specification) and a second label (used to get data from the egress service provider edge device to a destination customer edge device, and referred to as "an inner label" without loss of generality in the specification). The PEs may further map inner labels from received data to a channel (or circuit) identifier associated with the destination customer device.

§4.3 EXEMPLARY APPARATUS, OPERATIONS, METHODS AND DATA STRUCTURES

§4.3.1 Exemplary Operations and Data Structures

Figure 3:
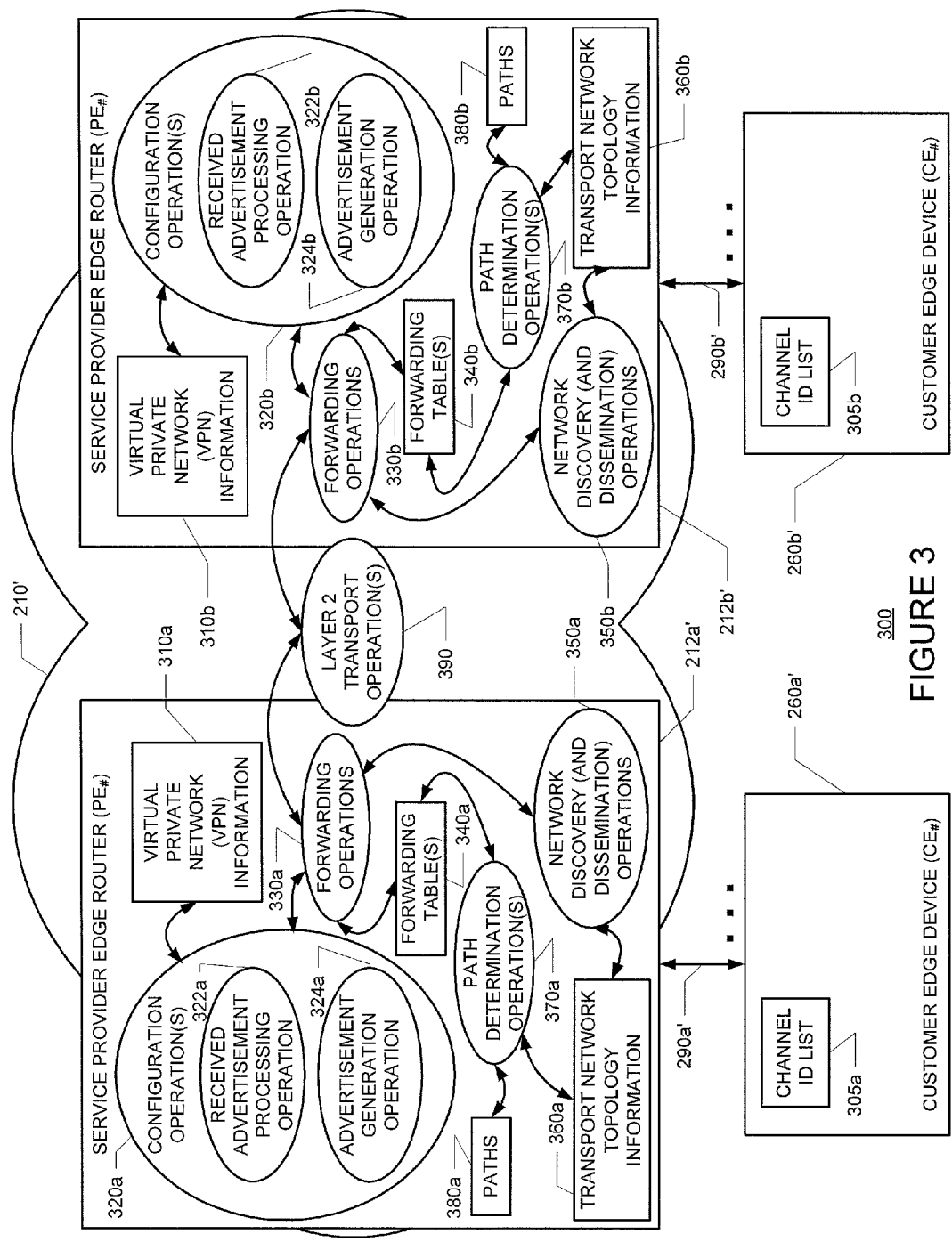
FIG. 3 is a bubble chart illustrating various operations that may be performed by, and various information that may be used by, service provider edge devices in accordance with the present invention.

FIG. 3 is a high-level bubble chart of operations that may be performed, and data that may be stored, by exemplary customer edge devices ("CEs") 260', exemplary service provider edge devices ("PEs") 212', and an exemplary transport network 210'. Referring to FIG. 3, suppose that the customer edge devices ("CEs") 260a' and 260b' belong to the same virtual private network, but are in geographically separate sites. Suppose further that the customer edge device ("CE") 260a' wanted to communicate with the customer edge device "CE" 260b'. Data (e.g., packets) from the customer edge device ("CE") 260a' would be (i) forwarded to a service provider edge device ("PE") 212a' via link 290a', (ii) forwarded by the forwarding operation 330a, based on information in its forwarding table(s) 340a, to the service provider edge device ("PE") 212b' associated with the destination customer edge device 260b', and (iii) forwarded from the service provider edge device ("PE") 212b to the destination customer edge device 260b'. Note that one or more intervening nodes (e.g., label-switching routers) may perform layer 2 transport operation(s) 390 between the service provider edge devices ("PEs") 212a' and 212b'.

As just described, a forwarding operation 330 may forward data based on forwarding table(s) 340. Naturally, such a table(s) needs to be populated with appropriate information, and may be so populated in accordance with known routing protocols. Briefly stated, a network discovery and dissemination operation 350 may be used to gather and disseminate topology information about the transport network 210'. Such information may be stored as transport network topology information 360 (e.g., a link state database). Using such transport network topology information 360, a path determination operation(s) 370 may generate paths 380, and may generate the forwarding table(s) 340 from such paths 380. The path determination operation(s) 370 may include shortest path first algorithms, constraint-based shortest path first algorithms, etc.

Recall that the transport network 210' may be used by multiple customers, supporting a separate VPN for each of the customers. Further, customers may want control over their own address space. That is, the service provider may not want to, or may not be able to, assume responsibility for customer addressing. Consequently, the service provider operating the transport network 210' might not be able to assume that all addresses (e.g., layer 3 addresses) are globally unique. Accordingly, the service provider will want to be able to distinguish data of different virtual private networks. To that end, each service provider edge device ("PE") may include VPN information 310.

As will become apparent from the following, the VPN information 310 may need to be configured throughout the transport network 210', or at least at the edge devices (PEs) 212' of the transport network 210'. To simplify such configuration, configuration operations 320 may be used to advertise VPN information (using an advertisement generation operation 324) and to process received advertisements (using a received advertisement processing operation 322).

§4.3.2 Exemplary Methods and Data Structures

In the following, exemplary methods are described, often with reference to flow charts. It should be appreciated that various acts described may often be performed in an order other than that shown. Also, information may be stored in data structures other than the exemplary data structures shown.

§4.3.2.1 Exemplary Packet Forwarding and Layer 2 Transport Methods

To reiterate, as a packet is forwarded from one customer edge device 260a' to another 260b', it traverses a path having three basic parts; namely, (i) from the first customer edge device 260a' to an associated ingress service provider edge device 212a', (ii) from that ingress service provider edge device 212a' to an egress service provider edge device 212b' associated with the destination customer edge device 260b', and (iii) from that egress service provider edge device 212b' to the destination customer edge device 260b'. The forwarding of a packet over each of these parts of the path is described below.

Data may be forwarded from the customer edge device (CE) 260a' to the ingress service provider edge device (PE) 212a' as follows. The media transmission unit ("MTU", which specifies a maximum packet size) on the layer 2 access links should be chosen such that the size of the layer 2 frames plus the layer 2 VPN header does not exceed the MTU of the (e.g., MPLS) transport network 210'. Otherwise, layer 2 frames that exceed the (e.g., MPLS) MTU after encapsulation may be dropped.

Figure 4:
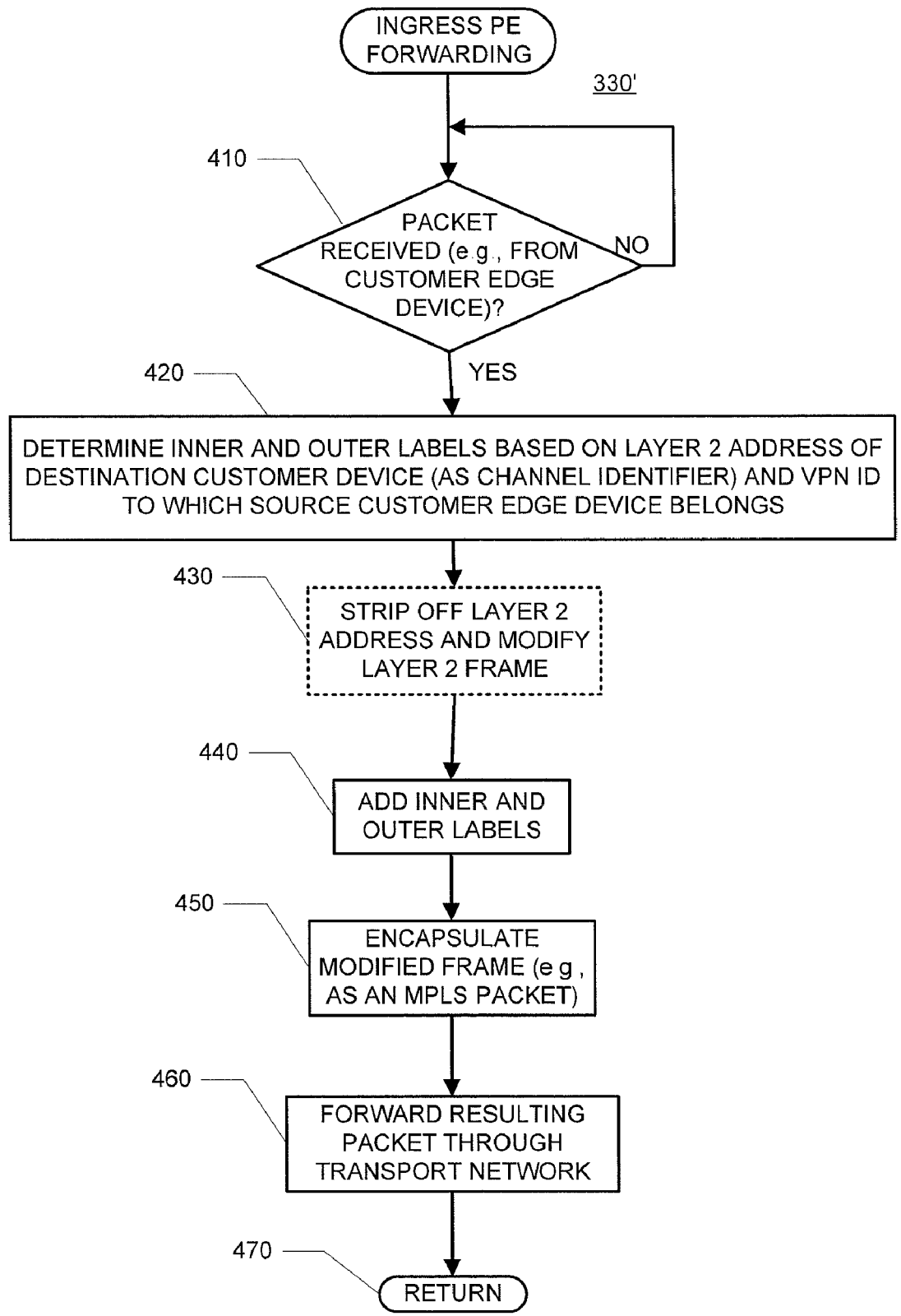
FIG. 4 is a flow diagram illustrating an exemplary method that may be used to forward data received at an ingress service provider edge device.

FIG. 4 is a high level flow diagram of an exemplary method 330' that may be used to effect data packet forwarding at an ingress service provider edge device (PE) 212a'. As indicated by conditional branch point 410, it is assumed that the method 330' is invoked upon receipt of data (e.g., a packet) from a customer edge device (CE) 260a'. When a packet arrives at a service provider edge device (PE) 212a' from a customer edge device (CE) 260a', in a layer 2 virtual private network, the layer 2 address of the packet identifies the destination customer edge device (CE) 260b'. The configuration operations 320, described in §4.3.2.5 below, will have previously installed a route that maps the layer 2 address (as a channel or circuit identifier) for a given VPN to a first (e.g., outer) label, used to get the data to the proper egress service provider edge device (PE) 212b', and a second (e.g., inner) label, associated with the destination customer edge device 260b'. (See, e.g., information 1040 of FIG. 10, described later.) The channel (or circuit) identifier may be a layer 2 address, a DLCI, a VPI/VCI, etc. Multiple services may be provided over a given physical connection. The method 330' may use such an installed route to determine inner and outer labels based on the layer 2 address of the destination customer edge device (CE) 260b' (as a channel or circuit identifier), as indicated by block 420. The layer 2 address may be stripped from the packet as indicated by block 430. This act 430 is optional, as indicated by the phantom lines. The inner and outer labels may then be added (e.g., prepended) to the data, as indicated by block 440. Finally, the packet may be encapsulated as an MPLS packet, as indicated by block 450 (e.g., provided with header information that identifies it as an MPLS packet), and sent towards the egress service provider edge device (PE) 212b' to which the destination customer edge device (CE) 260b' is attached, as indicated by block 460. The method 330' may then be left via RETURN node 470. Naturally, if another layer 2 technology is used in the transport network 210' instead of MPLS, the packet may be appropriately encapsulated as another type of packet identifying a protocol other than MPLS. For example, other tunneling technologies are possible. Further, generic routing encapsulation ("GRE") can be used for encapsulation.

Figure 8:
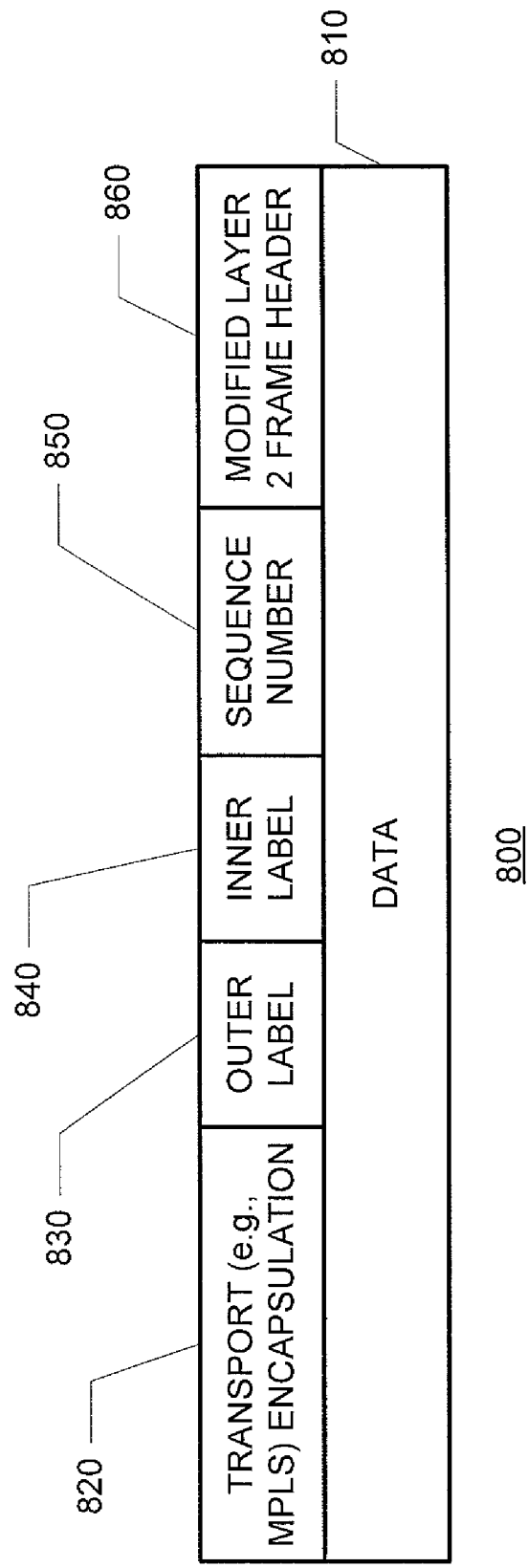
FIG. 8 illustrates an exemplary data structure of data, as modified by an exemplary ingress service provider edge device.

For each VPN encapsulation type, an exemplary format of the frame as transported in an MPLS LSP is described below with reference to FIG. 8. The "outer label" 830 may be used to transport the packet to the egress service provider edge device 212b' (i.e., the PE that is attached to the destination CE 260b'). The outer label 830 may be thought of as temporary label to be swapped with other labels as the packet traverses the "core", or label-switched path domain of transport network 210'. Since more than one customer edge device (CE) may be coupled with a given service provider edge device (PE), the "inner label" 840 may be used by the egress service provider edge device (PE) 212b' to distinguish which customer edge device (CE) to send the packet to, and what layer 2 address to use (if applicable). (See, e.g., information 1050 of FIG. 10, described later.) The "Sequence Number" 850 is an optional number (e.g., two octet unsigned number that wraps back to zero) that may be used to ensure in-sequence delivery of layer 2 frames. The sequence number field 850 should only be included if its use is indicated via VPN signaling. A layer 2 "connection" between two specific customer edge devices (CEs) is characterized within the MPLS network by the service provider edge devices (PEs) to which the two customer edge devices (CEs) are attached and a specific inner label 840 in each direction. For each such layer 2 connection, the sequence number field 850 may be set to zero for the first packet transmitted and incremented (e.g., by one) for each subsequent packet sent on the same layer 2 connection. When an out-of-sequence packet arrives at the receiver, it may be buffered for future delivery, or discarded.

Regarding field 860, the modification to the layer 2 frame header may depend on the layer 2 type. In general, the frame header is modified by removing 0 or more octets from the start of the frame. The following describes the modifications for ATM adaptation layer ("AAL/5"), ATM cells, Frame Relay, point-to-point protocol ("PPP"), Cisco high level data link control ("HDLC") and Ethernet VLAN.

For ATM AAL/5 VPNs, the AAL/5 protocol data unit ("PDU") may be transported without indication of the virtual path identifier/virtual channel identifier ("VPI/VCI"). At the egress service provider edge device (PE), the AAL/5 PDU is fragmented, a cell header with the correct VPI/VCI added to each cell, and the cells sent to the destination customer edge device (CE).

For ATM cell VPNs, ATM cells (including the 5 octet header) may be transported. At the egress service provider edge device (PE), the cells may be sent to the destination customer edge device (CE).

For Frame Relay VPNs (with two octet data link circuit identifiers ("DLCIs")), the two DLCI octets may be stripped, and the rest of the layer 2 frame may be transported. At the egress service provider edge device (PE), the new DLCI may be added back to the frame, and this may be sent to the destination customer edge device (CE).

For PPP, Cisco HDLC and unswitched Ethernet VLANs VPNs, the layer 2 frame may be transported whole, without any modification. The layer 2 frames should not include HLDC flags or Ethernet preamble, nor cyclic redundancy codes ("CRCs"). It may be assumed that bit/byte stuffing has been undone. At the egress service provider edge device (PE), the frame is sent to the destination customer edge device (CE).

Figure 5:
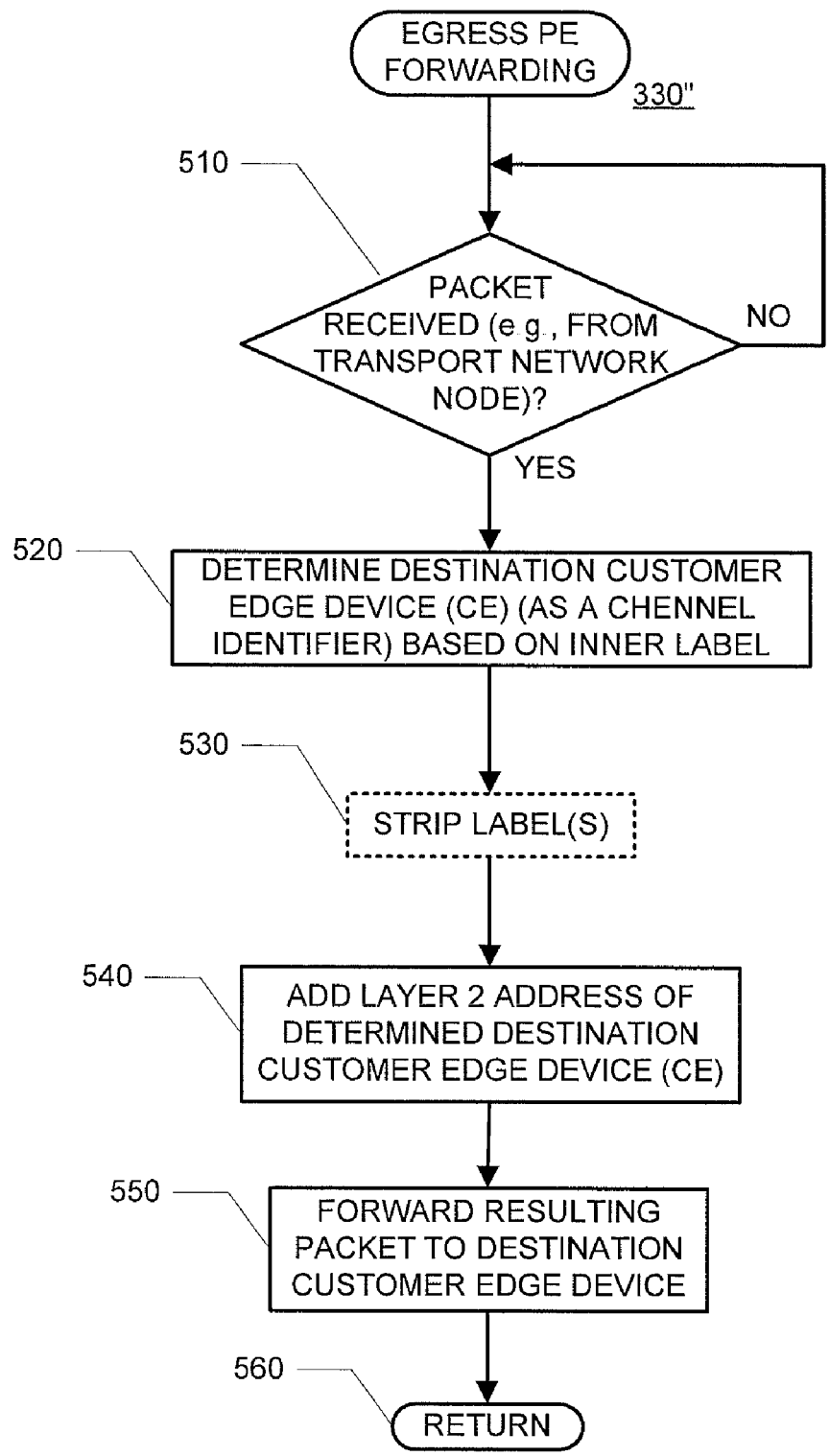
FIG. 5 is a flow diagram illustrating an exemplary method that may be used to forward data received at an egress service provider edge device.

FIG. 5 is a high level flow diagram of an exemplary method 330" that may be used to effect data packet forwarding at an egress service provider edge device (PE) 212b'. As indicated by conditional branch point 510, it is assumed that the method 330" is invoked upon receipt of data (e.g., a packet) from a node of the transport network 210'. As indicated by block 520, when the packet arrives at the egress service provider edge device (PE) 212b', the inner label may be used to determine which attached customer edge device (CE) is the destination customer edge device (CE) 260b', and which new layer 2 address to add (e.g., prepend) to the packet. This layer 2 address may be in the form of a channel (or circuit) identifier associated with the destination customer edge device (CE) 260b'. (See, e.g., information 1050 of FIG. 10, described later.) The inner and outer labels may be stripped, as indicated in block 530. This act 530 is optional, as indicated by the phantom lines used. Finally, the layer 2 address (e.g., as a channel or circuit identifier) may be added, as indicated by block 540. The fully-formed layer 2 packet may then be sent to the destination customer edge device (CE) 260b', as indicated by block 550. The method 330" may then be left via RETURN node 560.

Figure 6:
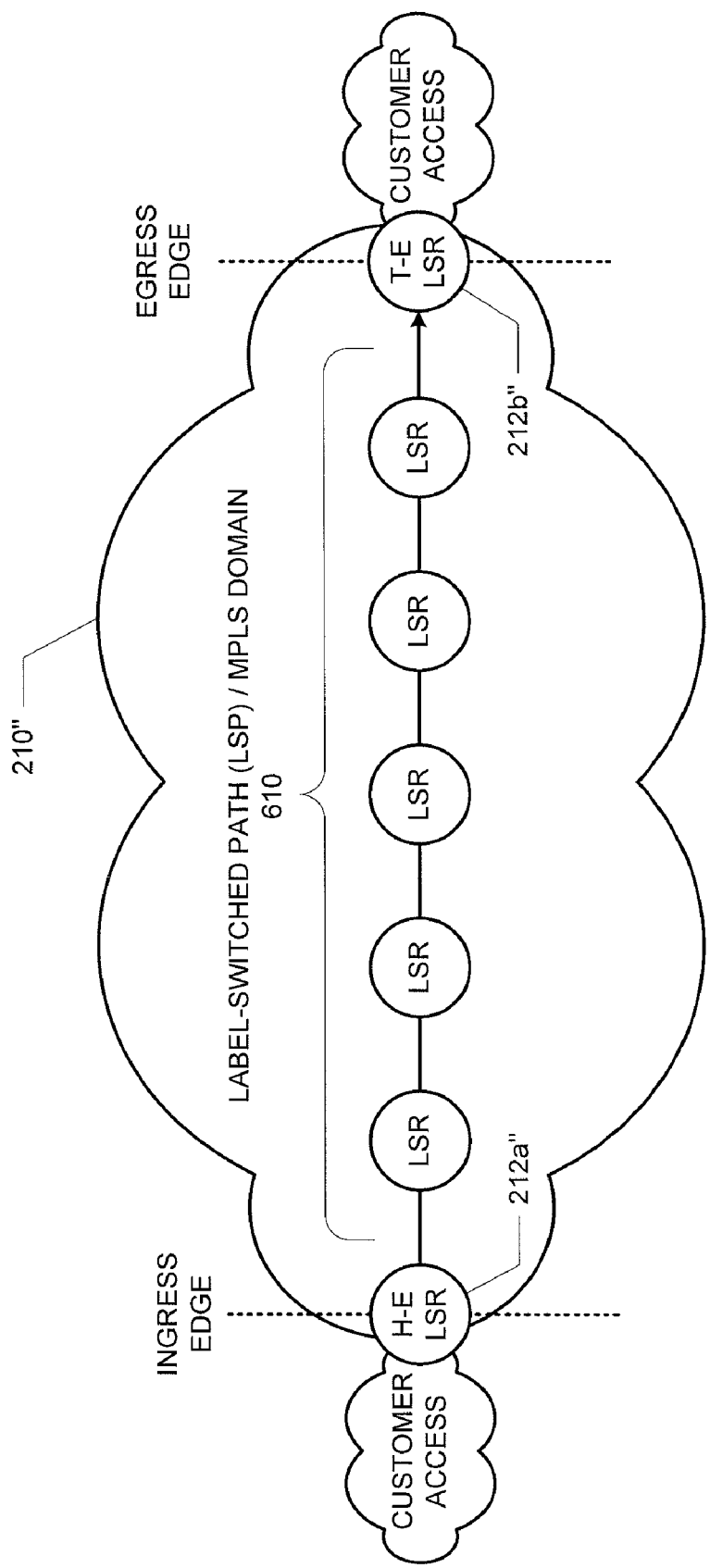
FIG. 6 is a diagram illustrating the concept of label-switched paths.

Between the ingress and egress service provider edge devices 212a' and 212b', the transport network 210' may provide layer 2 transport. In one exemplary embodiment, the packet forwarding operation 310 may be based on a label-swapping forwarding algorithm, such as MPLS for example. FIG. 6 illustrates a label switched path 610 across a network. Notice that label switched paths 610 may be simplex—traffic flows in one direction from a head-end label switching router (or "LSR") 212a" at an ingress edge to a tail-end label switching router 212b" at an egress edge. Duplex traffic requires two label switched paths—one for each direction. Notice that a label switched path 610 is defined by the concatenation of one or more label-switched hops, allowing a packet to be forwarded from one label switching router (LSR) to another across the MPLS domain 610.

A label is a short, fixed-length value carried in the packet's header to identify a forwarding equivalence class (or "FEC"). An FEC is a set of packets that are forwarded over the same path through a network even if their ultimate destinations are different. For example, referring to FIG. 2, if CEs were to communicate with both $CE_0$ and $CE_1$, packets defining such communications could use the same FEC. At the ingress edge of the network, each packet is assigned an initial label. More specifically, referring to the example illustrated in FIG. 7, an ingress label switching router 710 interprets the destination address 720 (as a channel or circuit identifier) of an unlabeled packet, maps that to an inner label and an outer label (only the outer label is illustrated), assigns a label 730 to the packet and forwards it to the next hop in the label-switched path. In the present invention, the initial label 730 may correspond to the outer label 830.

Figure 7:
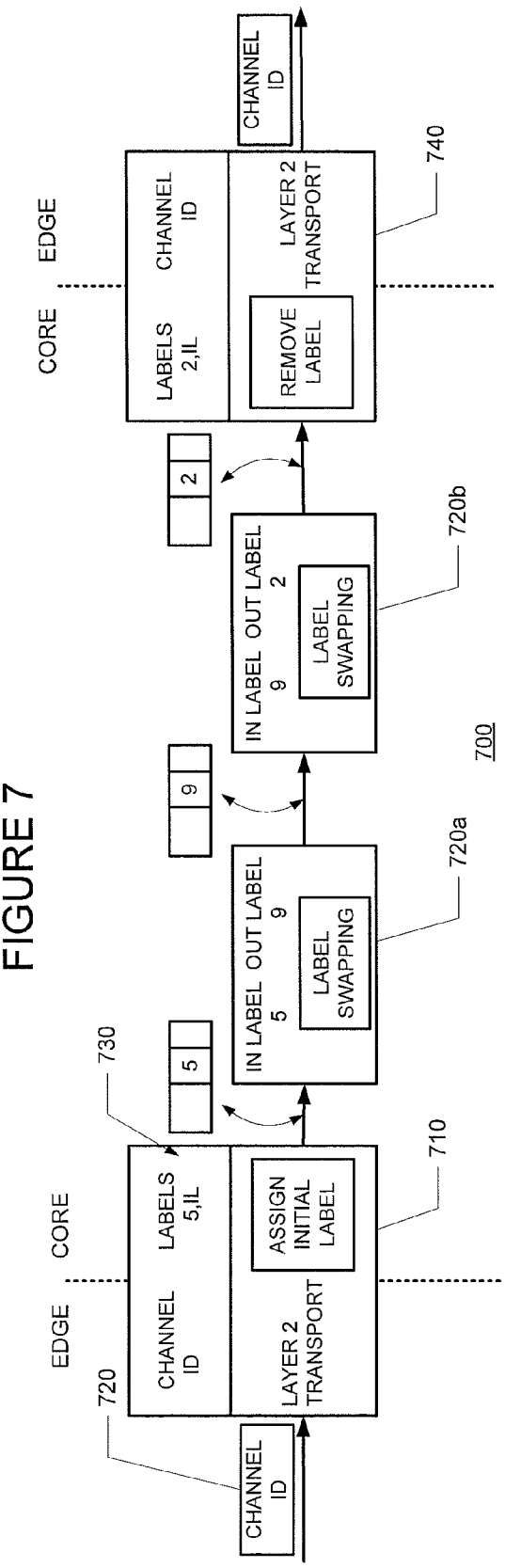
FIG. 7 is a block diagram illustrating operations within, and at the edges of, a label-switched path.

In the MPLS domain, the label switching routers (LSRs) 720 ignore the packet's network layer header and simply forward the packet using label-swapping. More specifically, when a labeled packet arrives at a label switching router (LSR), the input port number and the (outer) label 830 are used as lookup keys into an MPLS forwarding table. When a match is found, the forwarding component retrieves the associated outgoing label, the outgoing interface (or port), and the next hop address from the forwarding table. The incoming (outer) label is replaced with the outgoing (outer) label and the packet is directed to the outgoing interface for transmission to the next hop in the label switched path. FIG. 7 illustrates such label switching by label switching routers (LSRs) 720a and 720b.

When the labeled packet arrives at the egress label switching router, the router may operate in accordance with the method 330" described with reference to FIG. 5.

The forgoing description of the packet forwarding using label switching presumed the existence of label switched paths and associated label entries in forwarding tables. However, these paths must be determined and provided to each of the label switching routers (LSRs) in the label-switched path (LSP). Generating and distributing these label-switched paths may include steps of distributing information about the network to the label switching routers, path selection by the label switching routers based on such information, and signaling to distribute the determined label-switched paths to the label switching routers defining such paths.

Information distribution may be used to provide information about network topology and network loading so that label-switched paths may be determined. An interior gateway protocol (or "IGP"), optionally extended so that link attributes are included in each router's links-state advertisements, may be used to effect the network discovery and dissemination operations 350. Such link attributes may include, for example, maximum link bandwidth, maximum reservable link bandwidth, current bandwidth reservation, current bandwidth usage and link coloring. For example, intermediate system-intermediate system ("IS-IS") extensions may be supported by defining new type length values ("TLVs"), while open shortest path first ("OSPF") extensions can be implemented with opaque LSAs. The standard flooding algorithm used by link-state interior gateway protocols can be used to ensure that link attributes are distributed to all routers in the network administrator's routing domain. Node attribute information may also be gathered.

The transport network topology information can maintain network link attributes and topology information in a specialized traffic engineering database (or "TED"). (Recall, e.g., 360 of FIG. 3.) The traffic engineering database (TED) may be used when determining explicit paths for the placement of label-switched paths across the physical topology of the transport network 210'. A separate link state database may be maintained so that the subsequent traffic engineering computation is independent of the interior gateway protocol (IGP) and the IGP's link-state database.

Each head-end label-switching router may use its traffic engineering database (TED) to determine the paths for its own set of label-switched paths (LSPs) across the routing domain. The path for each label-switched path (LSP) can be represented by a strict or loose explicit route. The head-end label-switching router (LSR) may use a constraint-based routing technique (such as the constrained shortest path first (or "CSPF") technique for example) to determine the physical path for each label-switched path (LSP), based on information from the traffic engineering database (TED). The constrained shortest path first technique is repeated for each label-switched path (LSP) that the head-end label-switching router (LSR) needs to generate. In each case, the determined explicit label-switched path (LSP) is forwarded to the label-switching routers (LSRs) of the label-switched path (LSP) using a signaling technique.

Constrained shortest path first (CSPF) is merely one example of a constraint-based routing technique. The term "constraint-based routing" should be broadly interpreted to include any routing or packet forwarding technique that considers constraints.

In the transport network 210', so-called layer 2 virtual circuits may be established for a given flow of packets. Exemplary methods that may be used to effect at least a part of such path set-up signaling operations are now described. Since the information residing in the traffic engineering database (TED) of the head-end label-switching router (LSR) may become out-of-date, when the head-end label-switching router (LSR) uses the constrained shortest path first (CSPF) technique to determine a label-switched path, it may have relied on stale information. Accordingly, the candidate label-switched path (LSP) is not known to be workable until it is actually established by the signaling component. In one exemplary embodiment, signaling may be effected by a number of extensions to the resource reservation protocol (or "RSVP"). This topic is discussed in the white paper, Chuck Semeria, "RSVP Signaling Extensions for MPLS Traffic Engineering," *Part Number* 200006-002, pp. 1-29, Juniper Networks, Inc. (2000). This white paper is expressly incorporated herein by reference.

§4.3.2.5 Exemplary Configuration Methods

Recall from act 420 of FIG. 4 that, at an ingress service provider edge device (PE), inner and outer labels may be determined based on a layer 2 address of a destination customer device (e.g., as a channel or circuit identifier) and a VPN identifier. Recall from act 520 of FIG. 5 that, at an egress service provider edge device (PR), a destination customer edge device (e.g., as a channel or circuit identifier) may be determined based on an inner label. Both of these acts may use "channel" or "route" information stored at the service provider edge devices (PEs). The customer edge devices (CEs) may also store configuration information.

For example, referring to FIG. 9, each customer edge device (CE) may be configured (not necessarily by the service provider, but possibly by the customer for example) with information including a channel (or circuit) identifier list 910 used by a given customer edge device (CE) to reach another customer edge device (CE) within its VPN. The list 910 may include a number of entries, each entry may include an index (which may also serve as a customer edge device identifier) 912, a destination customer edge device identifier 914 (which may not be necessary if redundant to the index 912), and an associated channel (or circuit) identifier 916. The channel (or circuit) identifier 916 should be locally unique for a given VPN. The destination customer edge device identifier 914 should be unique within a VPN. The customer edge device (CE) may also be associated with (e.g., store) a label base 920, a range 930, and an encapsulation type 940.

Each customer edge device (CE) is configured to communicate with its corresponding service provider edge device (PE) with the set of channel (or circuit) identifiers. For example, CE0 is configured with channel (or circuit) identifiers 100 through 109. In one exemplary embodiment, OSPF is configured to run over each DLCI channel.

As can be appreciated, within a given VPN, each customer edge device (CE) also "knows" which channel (or circuit) identifier connects it to each other customer edge device (CE). The CE ID of the other CE may be used as an index into the list of channel (or circuit) identifiers this CE has (with zero-based indexing, i.e., 0 is the first index). For example, CE0 is connected to CE3 through its fourth channel (or circuit) identifier, 103. This is the methodology used in the examples illustrated in §4.4 below. The actual methodology used to pick the channel (or circuit) identifier to be used is a local matter. In this way, a first customer edge device (CE) may communicate with a second customer edge device (CE) using a different channel (or circuit) identifier than the one that the second customer edge device (CE) uses to communicate to the first customer edge device (CE). Thus, the service provider transport network effectively acts as a giant Frame Relay switch. This fact advantageously decouples the channel (or circuit) (or circuit) identifiers used at each CE site, thereby simplifying configuration.

Referring to FIG. 10, each service provider edge device (PE) may be configured with information including a list 1010 of virtual private network (VPN) identifiers. Each of the identified virtual private networks may include information 1020 about customer edge devices (CEs) belonging to that VPN. Such information 1020 may include, for each customer edge device (CE), a customer edge device identifier 1022, a label base 1024, a range 1026, and an encapsulation type 1028. Each of the identified customer devices in the VPN may also include a list of channel (or circuit) identifiers 1030 (which correspond to those 916 at the local customer edge device(s) (CEs). Further, each channel (or circuit) identifier of the list 1030 (to the extent that it is actually used) may include ingress forwarding information 1040 and egress forwarding information 1050. The ingress forwarding information 1040 may map a channel (or circuit) identifier 1042 (for a given customer edge device in a given VPN) to an outer label value 1044 and an inner label value 1046. The egress forwarding information 1050 may map an inner label value 1052 to a channel (or circuit) identifier 1054.

Some of the information used by each service provider edge device (PE) may be determined or provisioned locally. Manually provisioning each of the service provider edge devices (PE) with all of the needed information is possible, but is a burdensome task. In accordance with one embodiment of the present invention, much of the configuration information is signaled from other nodes (e.g., other service provider edge devices (PEs)) in the transport network 210'. Such signaling may be referred to below as advertising and processing received advertisements. Such signaling may be invoked when a new customer edge device (CE) is added to a VPN.

§4.3.2.5.1 Advertisement Generation Methods

The following exemplary methods focus primarily on the configuration that a service provider is responsible for, although the configuration of customer edge devices (CEs) is also addressed. One basic purpose of CE-PE configuration is to have them use consistent channel (or circuit) identifiers that will be used on the interface connecting them. If the PE-CE connection is Frame Relay, local management interface ("LMI") may be run between the PE and CE with the PE as data circuit-terminating equipment ("DCE") and the CE as data terminating equipment ("DTE"). If the PE-CE connection is ATM virtual channels ("VCs"), operations, administration, and management ("OAM") cells may be used. If the PE-CE connection is PPP or Cisco HDLC, keepalives may be used.

When adding a new site to a VPN, a new CE ID is chosen. If all current members of the VPN are over-provisioned, (e.g., their range includes the new CE ID), adding the new site is simply a local task. Otherwise, the sites that have a range that doesn't include the new CE ID, but wish to communicate directly with the new customer edge device (CE), may need to have their ranges increased to incorporate the new CE ID. Thus, effectively over-provisioning CE IDs by over-provisioning the number of channel (or circuit)s (e.g., DLCIs, VCIs, etc.) that connect the customer edge device (CE) to the service provider edge device (PE), it is easy to add new customer edge devices (CEs) and to configure the transport network accordingly. Such overprovisioning is a local matter and does not raise any serious challenges or problems.

To ensure that the new site has the required connectivity (e.g., full mesh, star, multiple star, etc.), the connectivity mechanism may need to be appropriately tweaked. For example, for full mesh connectivity, each of the PEs having CEs in a VPN are connected (e.g., via a tunnel). If the new CE (or its PE) is a spoke, then its PE merely needs to be connected to the hub PE. If the new CE (or its PE) is a hub, then its PE should be connected to each of the spoke PEs. More generally, to incorporate connectivity, a method for processing advertisements may be modified to consider whether or not two given customer edge devices are connected. Although more narrow notions of connectivity (e.g., full mesh) preclude arbitrary topologies from being built, it is a compromise of generality and efficiency.) However, in several common cases, the only configuration needed is local to the service provider edge device (PE) to which the customer edge device (CE) is attached.

Figure 11:
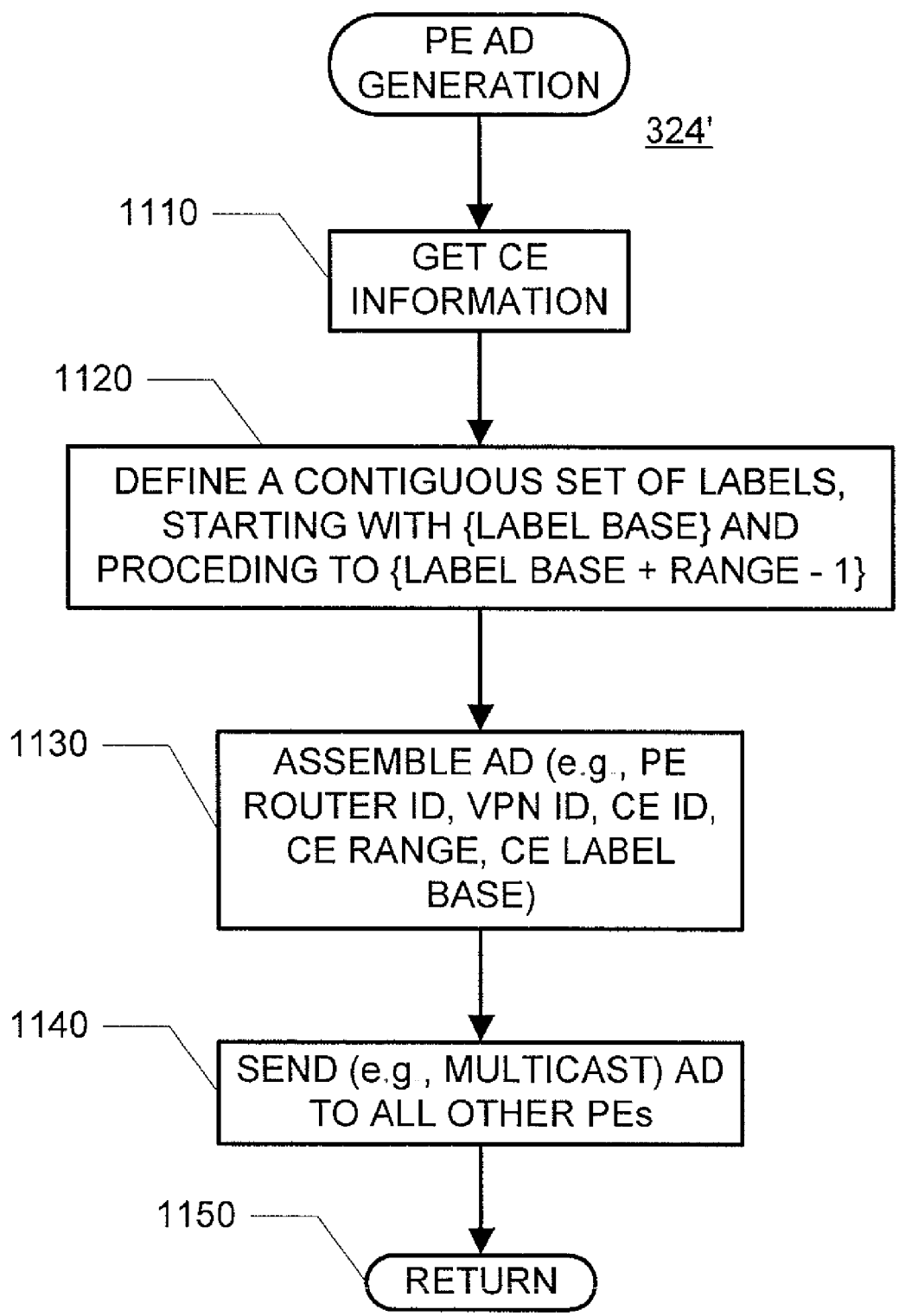
FIG. 11 is a flow diagram illustrating an exemplary method that may be used to generate an advertisement, regarding a new customer edge device, to other service provider edge device(s).

The flow diagram of FIG. 11 illustrates an exemplary method 324' for generating an advertisement (also referred to as an "ad"). As indicated by block 1110, a service provider edge device (PE) obtains all the needed information for a customer edge device (CE). Then, as indicated by block 1120, it defines a (e.g., contiguous) set of labels with n labels. The contiguous set of labels may begin at the label-base of the customer edge device (CE) and n may be the range of the customer edge device (CE). Thus, the smallest label in this set is the label-base. The service provider edge device (PE) may then assemble an advertisement (to inform other nodes in the transport network about the newly added CE) as indicated in block 1120. As indicated in FIG. 12, an exemplary advertisement 1200 may include an identifier for the service provider edge device (PE) (e.g., router) 1210 generating the ad, an identifier for the VPN ("VPN ID") 1220, an identifier for the new customer edge device CE ("CE ID") 1230, the CE's range 1240, and the CE's label-base 1250. Finally, the advertisement may be sent to all other service provider edge devices (PEs) as indicated in block 1140 before the method 324' is left via RETURN node 1150. As will be described below, service provider edge devices (PEs) that may not be part of the VPN can, nonetheless, receive and keep this information, in case at some future point, a customer edge device (CE) connected to the service provider edge device (PE) joins the VPN.

Notice that this method advantageously requires only a single advertisement (or if multiple ads are used, they may all have the same content, at least as far as their label base and CE identifier). Thus, for example, even if 20 DLCIs would be needed for a new CE to communicate with 20 other CEs in a given VPN, only one advertisement is needed. This fact has a number of advantages. First, it makes the advertisement well suited for broadcast or multicast, since all PEs in the VPN can use the same advertisement. Second, it reduces the control information exchange and the size of the routing table at each PE. State information used when generating advertisements is simplified. Finally, the routing information base of certain devices (e.g., a route reflector in a network running IBGP as its exterior gateway protocol) will not need to store as many advertisements.

If the PE-CE connection goes down, or the CE configuration is removed, the above advertisement should be withdrawn. Such ad withdrawal may be signaled by a separate message.

Regarding the act 1140 of sending the ad to all other service provider edge devices (PEs) (or only those in the VPN), two exemplary techniques for signaling MPLS-based layer 2 VPNs are now described. First, signaling such ads using a label distribution protocol ("LDP") (See, e.g., the article L. Andersson et al., "LDP Specification," draft-ietf-mpls-ldp-11.txt (August 2000), which is incorporated herein by reference) is described. Then, signaling such ads using border gateway protocol ("BGP") version 4 (See, e.g., the article Y. Rekhter, "A Border Gateway Protocol 4 (PGP-4)", *RFC 1771*, the Internet Engineering Task Force (March 1995), which is incorporated herein by reference) is described.

In label distribution protocol ("LDP"), VPN CE information and its associated label base may be carried in a "Label Mapping" message, distributed in the downstream unsolicited mode described in the Andersson article. FIG. 13 illustrates an exemplary FEC element 1300 that may be used to carry all the information corresponding to a VPN CE, except for the label base. The label base may be carried in the Label (type-length-value ("TLV") (not shown) following the FEC TLV. As indicated, the exemplary FEC element 1300 may include a one byte "type" field 1305, a one byte "encapsulation type" field 1310, a two byte "length" field 1315, a one byte "control flags" field 1320, a three byte reserved space 1325, a four byte "VPN identifier" field 1330, a two byte customer edge device identifier (CE ID) field 1335, a two byte customer edge device range field 1340, a four byte customer edge device connectivity field 1345, and sub-TLVs 1350. If a FEC element 1300 in a FEC TLV encodes layer 2 VPN information, it should be the only FEC element in the FEC TLV.

In BGP, the multiprotocol extensions described in the Rekhter article may be used to carry layer 2-VPN signaling information. The Rekhter article defines the format of two BGP attributes—"MP_REACH_NLRI" and "MP_UN-REACH_NLRI"—that can be used to announce and withdraw the announcement of reachability information. An exemplary address family identifier ("AFI") may be used for L2-VPN (to be assigned by the Internet Assigned Numbers Authority ("IANA")), a new subsequent address family identifier ("SAFI") (to be assigned by IANA), and also a new network layer reachability information ("NLRI") format for carrying the individual L2-VPN CE information. This NLRI may be carried in the above-mentioned BGP attributes. This NLRI should be accompanied by one or more extended communities. The extended community type is "Layer 2 VPN" (to be assigned by IANA); and the format may be <VPN-ID>: <connectivity>, where <VPN-ID> is 4 octets in length, and <connectivity> is two octets. All extended communities accompanying one or more Layer 2 VPN NLRIs should have the same <VPN-ID>.

Service provider edge devices (PEs) receiving VPN information may filter advertisements based on the extended communities, thus controlling CE-to-CE connectivity.

FIG. 14 illustrates an exemplary Layer 2 VPN NLRI 1400. In LDP, the "Length" field 1410 may specify the entire length of the L2 VPN FEC element 1300, including the fixed header and all the sub-TLVs 1350. In BGP, the "Length" field 1410 may indicate the length, in octets, of the L2-VPN address prefix. The encapsulation type field 1420 may identify the layer 2 encapsulation (e.g., ATM, Frame Relay, etc.). The following lists exemplary encapsulation types:

| Value | Encapsulation |
| --- | --- |
| 0 | Reserved |
| 1 | ATM PDUs (AAL/5) |
| 2 | ATM Cells |
| 3 | Frame Relay |
| 4 | PPP |
| 5 | Cisco-HDLC |
| 6 | Ethernet VLAN (unswitched) |
| 7 | MPLS |

The control flags field 1430 may be a bit vector. One bit of the bit vector may indicate that a sequenced delivery of frames is required. The label-base field 1440 may be used for determining the inner label for forwarding packets to the customer edge device (CE) identified by CE ID. LDP may carry the label-base in the Label TLV following the FEC TLV. Referring to FIG. 13, the VPN ID field 1330 may be a 32-bit number which uniquely identifies a VPN in a provider's domain. The CE ID field 1335/1460 may be 16-bit number which uniquely identifies a customer edge device (CE) in a VPN. The CE Range field 1340/1470 may be a 16-bit number which describes the range of CE IDs to which the advertised customer edge device (CE) is willing to connect. In particular, a service provider edge device (PE) receiving an L2 VPN TLV should not use a label greater than or equal to <label-base>+ <CE range> when sending traffic for this VPN to the advertising service provider edge device (PE). Referring to FIG. 13, a CE connectivity field 1345 may be a 32-bit number encoding connectivity. For example, if the leftmost bit is "1", the CE may be identified as a spoke. The remaining 31 bits may encode the CE colors (bit i=1 means the CE has color i).

Regarding field 1350 of FIG. 13, new sub-TLVs can be introduced as needed. In LDP, the TLV encoding mechanism described in the Andersson article may be used. In BGP, TLVs (type takes 1 octet) can be added to extend the information carried in the L2 VPN address prefix. A TLV (type=1) may be used for carrying VLAN IDs if the encapsulation is VLAN.

The BGP Multiprotocol capability extension described in the article R. Chandra et al., "Capabilities Advertisement with BGP-4," *RFC* 2842, the Internet Engineering Task Force (May 2000) may be used to indicate that the BGP speaker wants to negotiate L2 VPN capability with its peers. The capability code is 1, the capability length is 4, and the AFI and SAFI values may be set to the L2 VPN AFI and L2 VPN SAFI, respectively.

Using BGP to signal MPLS-based layer 2 VPNs has a number of advantages. First, edge routers (PE) in a service provider transport network typically run BGP v4. This means that service providers are familiar with using BGP, and have already configured BGP on their edge routers (PEs). In such a case, configuring and using BGP to signal layer 2 VPNs is not much of an additional burden to the service provider operators. This is especially true when the protocol of choice for signaling MPLS LSPs across the service provider transport network is RSVP (perhaps for its Traffic Engineering properties). Further, with BPG it is easier to build inter-provider VPNs.

§4.3.2.5.2 Received Advertisement Processing Methods

Figures 15, 15A:
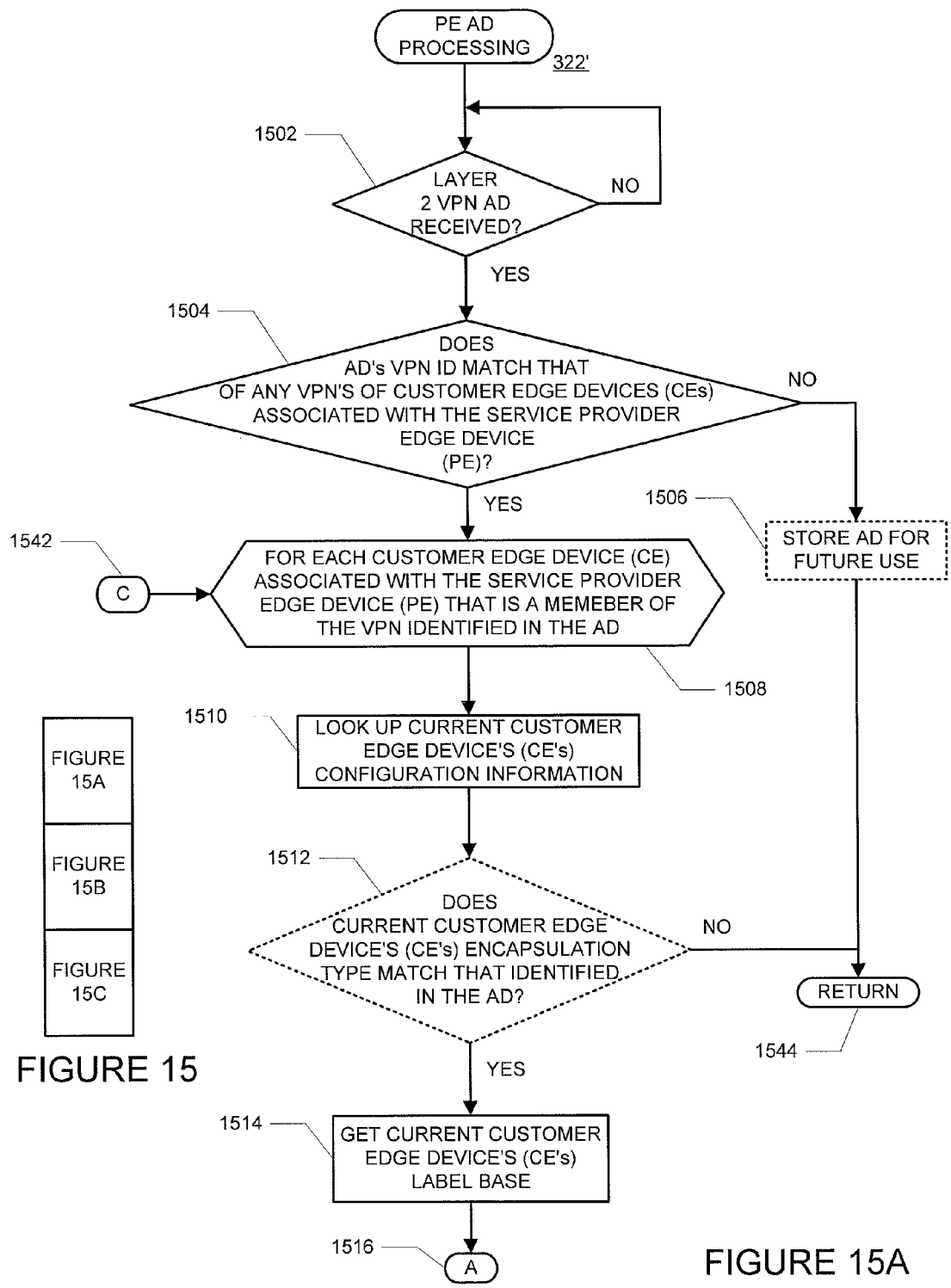
FIG. 15 illustrates the arrangement of FIGS. 15A through 15C which, collectively, define a flow diagram illustrating an exemplary method that may be used to process an advertisement signaling a newly added customer edge device.
Figure 15B:
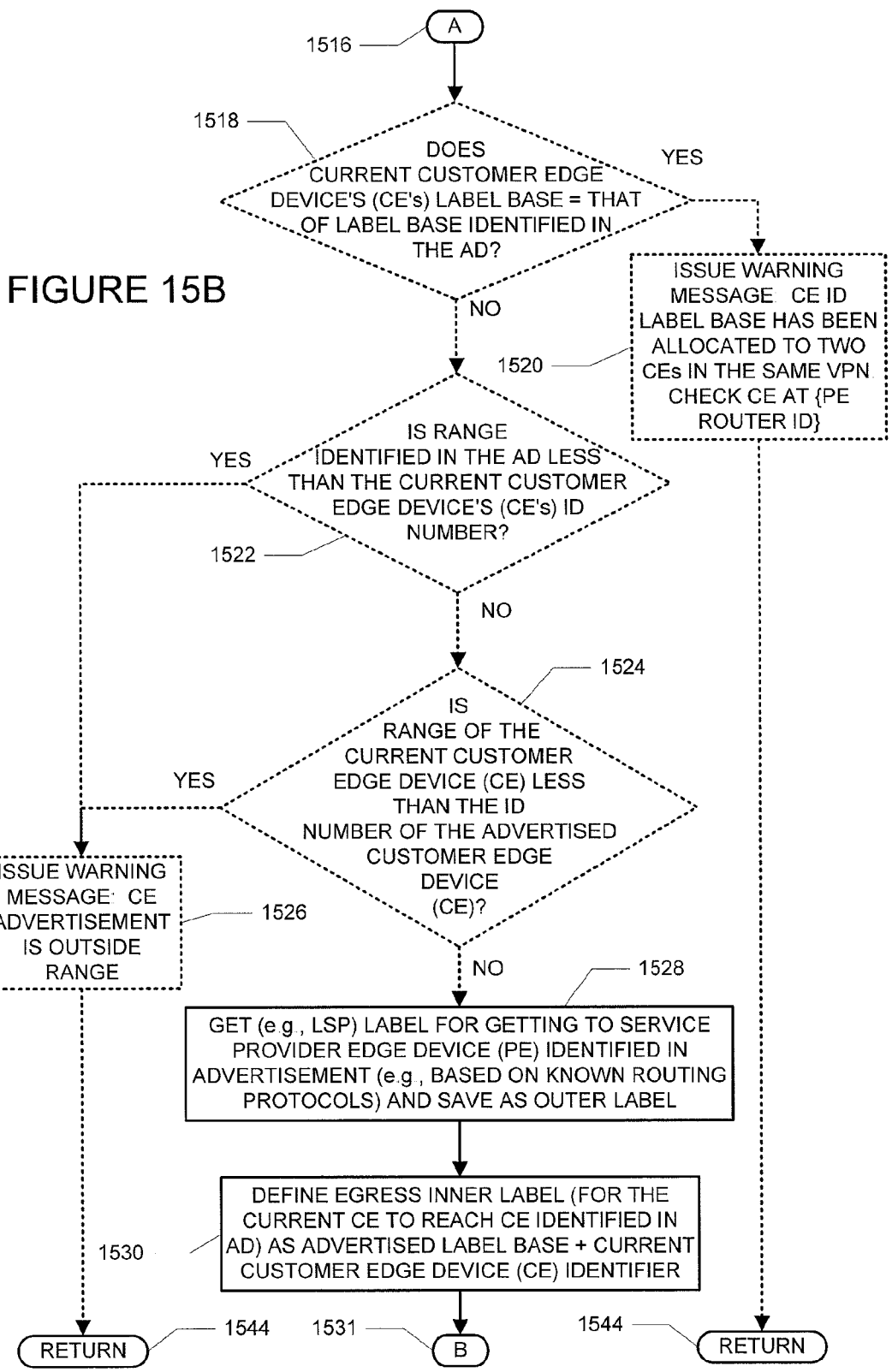
Figure 15C:
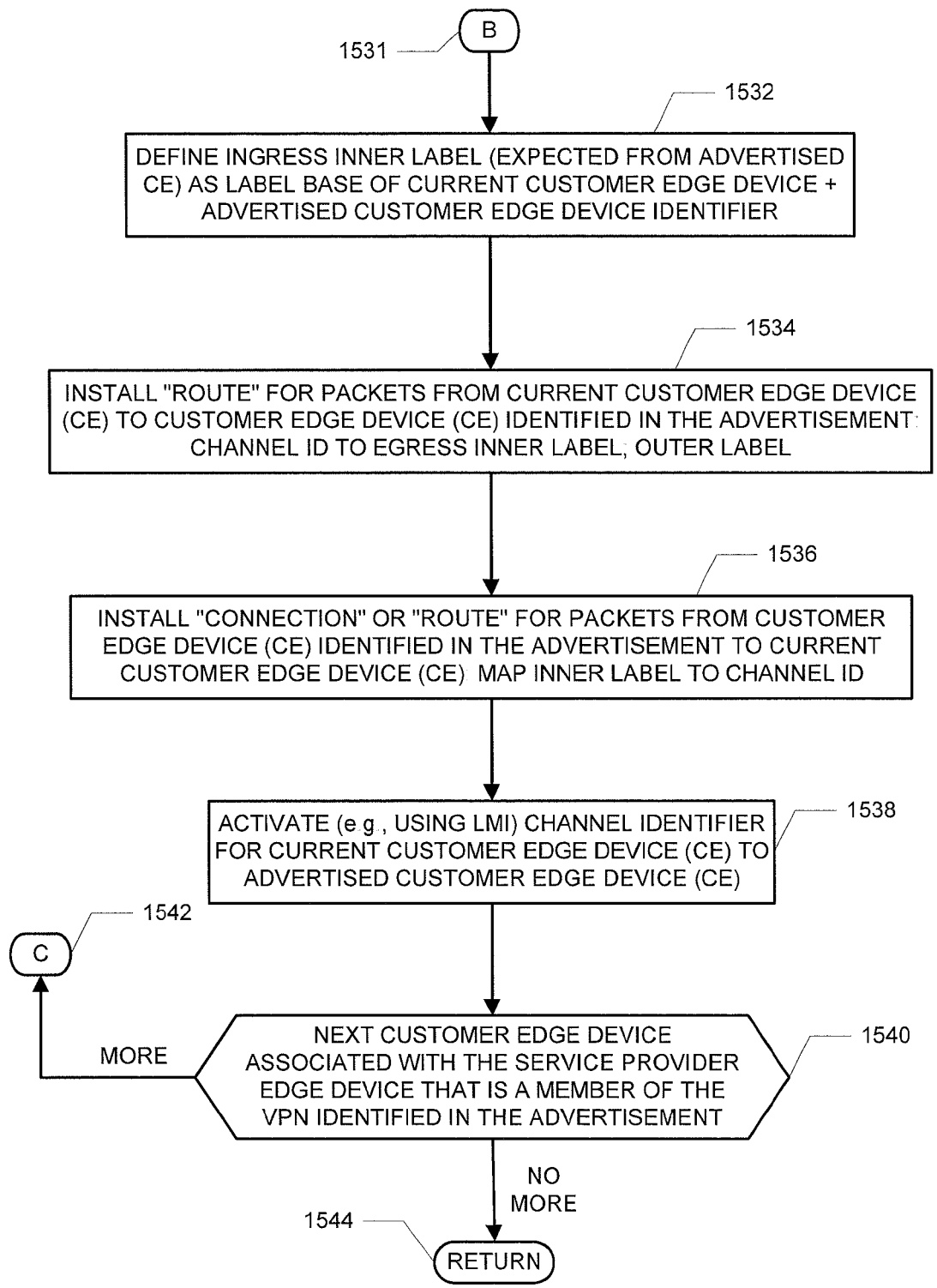

FIG. 15 illustrates the arrangement of FIGS. 15A, 15B, and 15C, which, collectively, illustrate a flow diagram of an exemplary method 322' that may be carried out by a service provider edge device (PE) upon receiving an advertisement, as indicated by conditional branch point 1502. As indicated by conditional branch point 1504, when a service provider edge device (PE) receives a layer 2 VPN advertisement, it checks if the VPN ID matches any VPN that it is a member of. (Recall 1010 of FIG. 10.) If not, the service provider edge device (PE) may just store the advertisement for future use, as indicated by optional block, before the method 322' is left via RETURN node 1544. If, on the other hand, the VPN ID in the advertisement matches any VPN that it is a member of, then the method 322' may perform a number of acts for each customer edge device (CE) that is a member of the VPN identified in the ad and that is associated with the service provider edge device (PE) as indicated by loop 1508-1540.

More specifically, the current customer edge device's configuration information is looked up as indicated in block 1510. As indicated by optional conditional branch point 1512, if the encapsulation type for the VPN identified in the advertisement (Recall, e.g., 1310 and 1420 of FIGS. 13 and 14, respectively.) does not match the configured encapsulation type (Recall, e.g., 1028 of FIG. 10.), then the method 322' may be left via RETURN node 1544. If, on the other hand, the encapsulation types are compatible, the label base (Recall, e.g., 1024 of FIG. 10.) allocated for the current customer edge device (CE) is obtained, as indicated by block 1514. The method 322' may then proceed, via node A 1516, to optional conditional branch point 1518.

Basically, the conditional branch point 1518 determines whether there is an address space overlap (by the two customer edge devices (CEs) currently being processed) within the VPN identified in the ad. This may be checked, at least in part, by determining whether or not the current customer edge device's label base equals the label base in the advertisement. If so, a warning message (e.g., "Error: CE ID k has been allocated to two CEs in VPN X (check CE at PE A)") may be issued as indicated in optional block 1520 before the method 322' is left via RETURN node 1544. If, on the other hand, the current customer edge device's label base does not equal the label base in the advertisement, the method 322' may proceed to conditional branch point 1522.

Basically, the conditional branch points 1522 and 1524 determine if enough channel (or circuit) identifiers have been preprovisioned at the advertising service provider edge device (PE) and the receiving service provider edge device (PE), respectively. For example, at conditional branch point 1522, it may be determined whether the range identified in the advertisement (Recall, e.g., field 1240 of FIG. 12.) is less than the current customer edge devices ID number (Recall, e.g., 1022 of FIG. 10.). At conditional branch point 1524, it may be determined whether the range of the current customer edge device (CE) (Recall, e.g., 1016 of FIG. 10.) is less than the ID number of the advertised customer edge device (Recall, e.g., 1230 of FIG. 12.). If either of these determinations is true, a warning (e.g., "Cannot communicate with CE k or m (PE A or B) of VPN X: outside range") may be issued, as indicated by optional block 1526, before the method 322' is left via RETURN node 1544. Otherwise, if neither or these determinations are true, the method 322' may branch to block 1528.

At block 1528, the current service provider edge device (PE) may determine a first label (referred to as an "outer label") used to get to the service provider edge device (PE) that sourced the advertisement. This information may have been determined in accordance with known routing protocols, such as those described above, or extensions thereof. At block 1530, the channel (or circuit) identifier that can be used to get from the service provider edge device (PE) to the current customer edge device (CE) may be determined and saved as an egress inner label. This egress inner label for sending packets to current customer edge device (CE) corresponds to a channel (or circuit) identifier. The channel (or circuit) identifier may be determined by adding the advertised label base (Recall, e.g., 1250 of FIG. 12.) to the current customer edge device (CE) identifier (Recall, e.g., 1022 of FIG. 10.). At block 1532, the channel (or circuit) identifier that can be used as an ingress inner label may be determined by adding the label base of the current customer edge device (CE) (Recall, e.g., 1024 of FIG. 10.) to the advertised customer edge device (CE) identifier (Recall, e.g., 1230 of FIG. 12.).

Next, so-called "connections" or "routes", which map a channel (or circuit) ID of an ingress packet to an inner label and an outer label, and which map a inner label of an egress packet to a channel (or circuit) ID, are installed at the service provider edge device (PE) receiving the advertisement (or somewhere accessible to that PE). More specifically, as indicated in block 1534, a "connection" or "route" for packets from the current customer edge device (CE) to the customer edge device identified in the advertisement is installed. This connection or route may include a mapping of a channel (or circuit) identifier to an outer label (to get to the proper egress service provider edge device) and an inner label (to get from the egress service provider edge device to the proper customer edge device). (Recall, e.g., 1040 of FIG. 10.) Further, as indicated in block 1536, a "connection" or "route" for packets from the customer edge device identified in the advertisement to the current customer edge device is installed. This connection may include a mapping of an inner label to a channel (or circuit) identifier. (Recall 1050 of FIG. 10.)

Finally, the channel (or circuit) identifier for the current customer edge device to the advertised customer edge device may be activated. (Recall that channels (or circuits) may be preprovisioned.) The method 322' may then be left via RETURN node 1544.

If an advertisement is withdrawn, the appropriate channel (or circuit) identifier should be de-activated, and the corresponding connections or routes should be removed from the forwarding table.

4.3.2.5.3 Generalizing the VPN Topology

In some of the signaling methods described above, it was assumed, for simplicity, that the VPN was a full mesh. To allow for more general VPN topologies when using LDP for signaling, a node's "connectivity" can be derived from node colors and a "spoke" attribute. More specifically, a node (CE) in a VPN can be colored with one or more colors. Furthermore, a node may be a hub or a spoke. Two nodes are connected if they share a color in common, and they are not both spokes. (Recall, e.g., field 1345 of FIG. 13.)

To incorporate connectivity, the method 322' of FIG. 15 may be modified such that if the two customer edge devices (CE k and CE m) are not connected, the method 322' is left without further processing. Although this exemplary notion of connectivity precludes arbitrary topologies from being built, it is a compromise of generality and efficiency.

A more general mechanism based on BGP extended communities can also be used.

§4.3.3 Exemplary Apparatus

Figure 16:
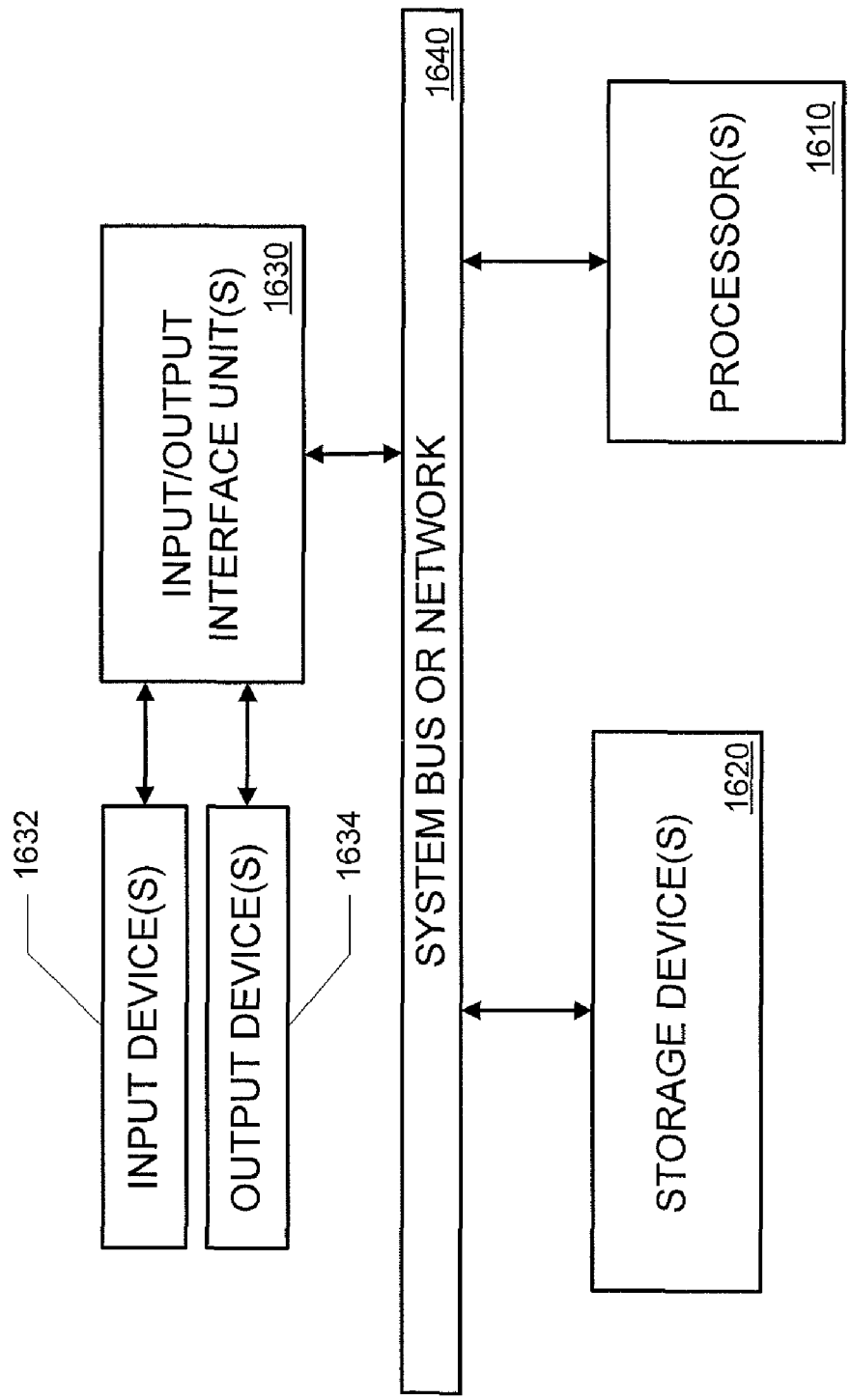
FIG. 16 is a block diagram of an apparatus that may be used to effect operations of the present invention, and to store information used and/or generated by the present invention.

FIG. 16 is high-level block diagram of a machine 1600 which may effect one or more of the operations discussed above. The machine 1600 basically includes a processor(s) 1610, an input/output interface unit(s) 1630, a storage device(s) 1620, and a system bus(es) and/or a network(s) 1640 for facilitating the communication of information among the coupled elements. An input device(s) 1632 and an output device(s) 1634 may be coupled with the input/output interface(s) 1630. Operations of the present invention may be effected by the processor(s) 1610 executing instructions. The instructions may be stored in the storage device(s) 1620 and/or received via the input/output interface(s) 1630. The instructions may be functionally grouped into processing modules.

The machine 1600 may be a router for example. In an exemplary router, the processor(s) 1610 may include a microprocessor, a network processor, and/or (e.g., custom) integrated circuit(s). In the exemplary router, the storage device(s) 1620 may include ROM, RAM, SDRAM, SRAM, SSRAM, DRAM, flash drive(s), hard disk drive(s), and/or flash cards. At least some of these storage device(s) 1620 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 1620 and/or may be received from an external source via an input interface unit 1630. Finally, in the exemplary router, the input/output interface unit(s) 1630, input device(s) 1632 and output device(s) 1634 may include interfaces to terminate communications links.

Naturally, the operations of the present invention may be effected on systems other than routers. Such other systems may employ different hardware and/or software.

§4.4 EXEMPLARY OPERATIONS

Examples illustrating exemplary forwarding and configuration operations in an exemplary embodiment of the present invention are now provided.

§4.4.1 Forwarding Example

An example of data (e.g., a packet) being forwarded in accordance with the present invention is now described with reference to FIGS. 3, 9, 10, 17A and 17B. Referring to FIG. 3, it is assumed that the identifier of a source customer edge device 260a' is CE 0, the identifier of a destination customer edge device 260b' is CE 4, and that there exists one or more label-switching routers between ingress service provider edge device 212a' and egress service provider edge device 212b'.

Figure 17:
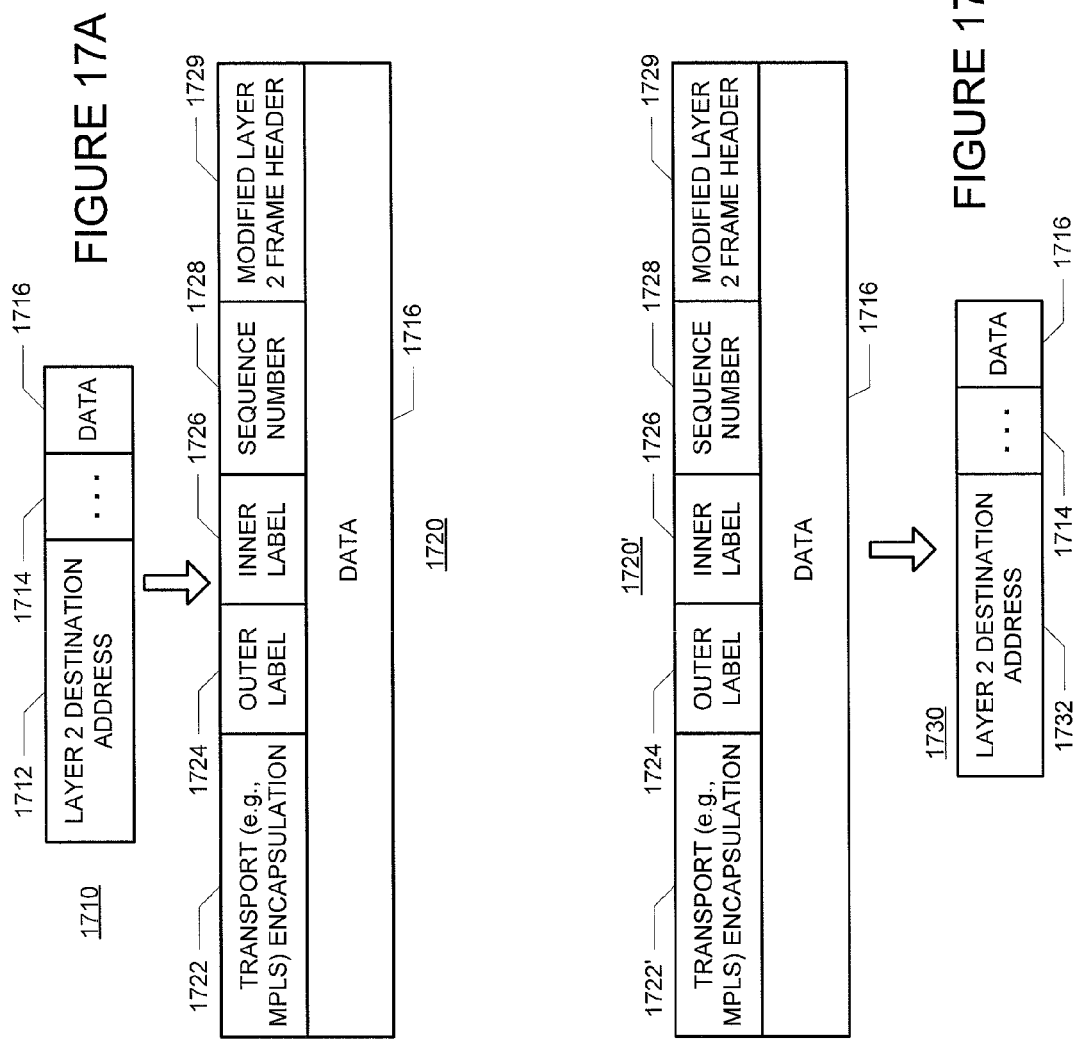
FIG. 17A illustrates an exemplary forwarding operation of data at an ingress service provider edge device.
FIG. 17B illustrates an exemplary forwarding operation of data at an egress service provider edge device.

Referring to FIG. 17A, the data 1710 sent by the source customer edge device 260a' may include layer 2 destination information (e.g., as a channel or circuit identifier) 1712, data 1716, and other information 1714. Referring to FIG. 9, the source customer edge device 260a' may include a channel (or circuit) identifier (e.g., 104) associated with a destination customer edge device (e.g., CE 4) in the VPN. The layer 2 destination information 1712 and/or the other information 1714 may identify the VPN.

Still referring to FIG. 17A, the ingress service provider edge device 212a' may (i) use the layer 2 destination address information and VPN identifier to look up labels (Recall, e.g., 1040 of FIG. 10.), (ii) strip off the layer 2 destination address information, and (iii) add the labels, thereby generating a new frame or packet 1720. (Recall, e.g., the exemplary method of FIG. 4.) For example, the "outer label" 1724 may be used to transport the packet to the egress service provider edge device 212b' (i.e., the PE that is attached to the destination CE 260b'). Since more than one customer edge device (CE) may be coupled with a given service provider edge device (PE), the "inner label" 1726 may be used by the egress service provider edge device (PE) 212b' to determine which of the customer edge devices (CE) to send the packet to, and what layer 2 address to use (if applicable). The "sequence number" 1728 is an optional (e.g., two octet unsigned number that wraps back to zero) that may be used to ensure in-sequence delivery of layer 2 frames. Recall that the modification to the layer 2 frame, and hence the modified layer 2 frame header 1729, may depend on the layer 2 type. Other transport (e.g., MPLS) information 1722 may also be included. This information 1722 may serve to identify the transport network technology used.

Referring now to FIG. 17B, the egress service provider edge device 212b' may (i) determine layer 2 destination information (e.g., a channel or circuit identifier) from the inner label 1726 (Recall, e.g., 1050 of FIG. 10.), (ii) add such information 1732 to the data, (iii) strip off transport encapsulation information 1722', and (iv) strip off the labels 1724, 1726, thereby generating a new frame or packet 1730. (Recall, e.g., the exemplary method of FIG. 5.)

The egress service provider edge device 212b' may then forward the data 1730 to the destination customer edge device 260b'.

§4.4.2 Configuration Example

Figure 18:
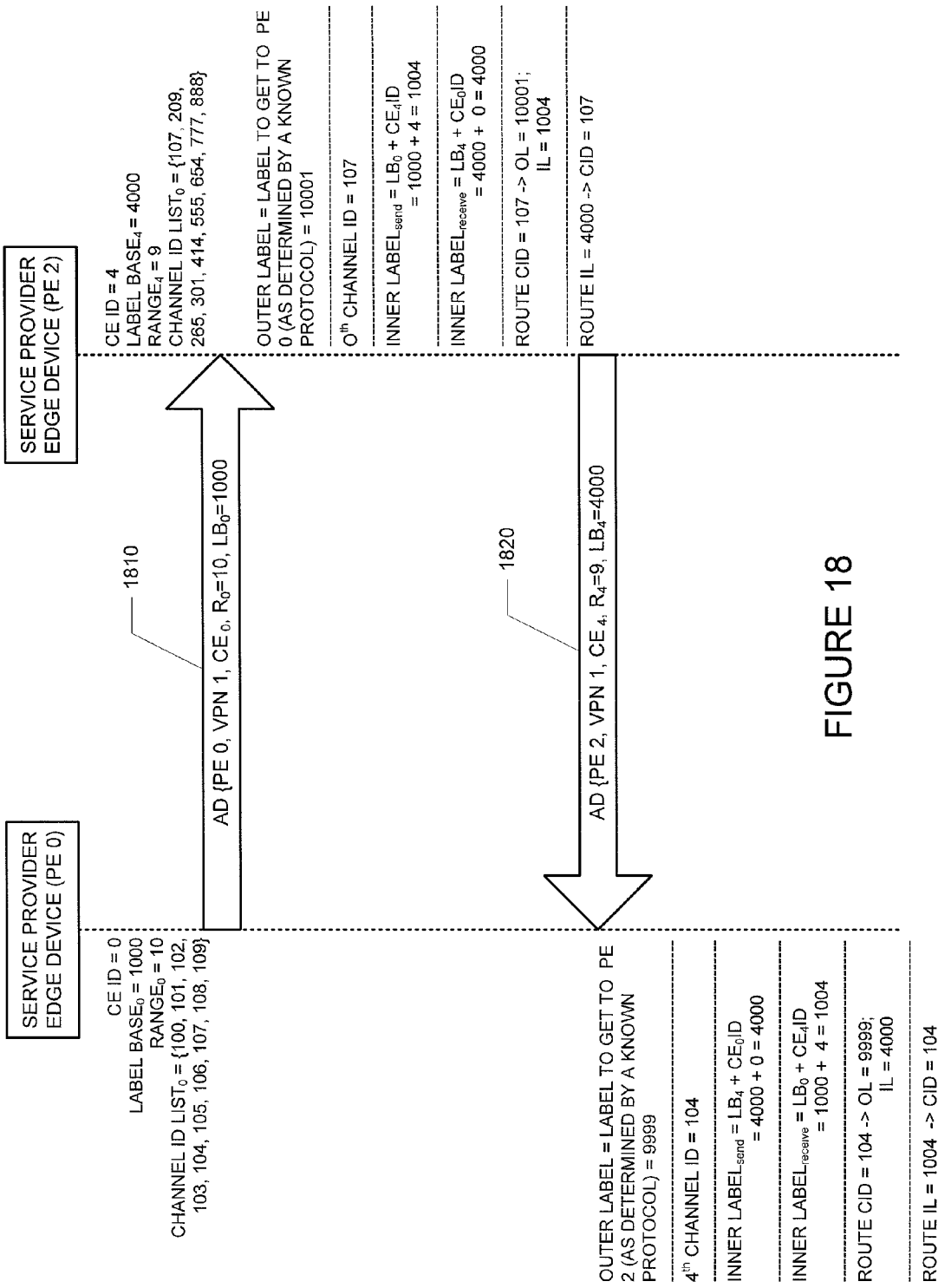
FIG. 18 is a messaging diagram illustrating exemplary advertisement operations in an exemplary embodiment of the present invention.

An example of disseminating (e.g., advertising) configuration information in accordance with the present invention is now described with reference to FIGS. 2, 10, and 18. Referring to FIG. 2, assume that the VPN connecting the sites S0 220, S1 230, S2 240 and S3 250 has a VPN identifier (VPN ID) of 1. Assume that customer edge device CE 0 260a is added. Assume further that the customer edge device CE 0 260a has a label base of 1000, a range of 10, and has (pre) provisioned channel (or circuit) identifiers 100, 101, 102, 103, 104, 105, 106, 107, 108 and 109.

The service provider edge device PE 0 associated with the newly added customer edge device CE 0 will generate an advertisement in response to the newly added customer edge device. (See, e.g., the exemplary method of FIG. 11.) Recall from FIG. 12 that such an advertisement may include an identifier of the service provider edge device generating the ad 1210, a VPN identifier 1220, a customer edge device identifier 1230, a CE range 1240, and a CE label base 1250. The transmission of the ad is depicted in communication 1810 of FIG. 18.

Although all service provider edge devices (in the VPN) may process the ad, in the following, only the processing of the service provider edge device PE 2 212*c* is described. As indicated in FIG. 18, the service provider edge device PE 2 212*c* receives an advertisement from the service provider edge device PE 0 212*a* for VPN 1, CE ID=0 with CE range $R_0$=10 and label base $L_0$=1000. Since the service provider edge device PE 2 212*c* is connected to a customer edge device CE 4 260*e* which is also in VPN 1, it may perform the following acts.

First, it 212*c* may look up the configuration information associated with CE 4. (Recall e.g. 1510 of FIG. 15 and 1020 of FIG. 10.) In this example, it is assumed that the advertised encapsulation type matches the configured encapsulation type (e.g., both are Frame Relay), so it 212*c* proceeds. (Recall 1512 of FIG. 15, 1028 of FIG. 10, 1310 of FIG. 13 and 1420 of FIG. 14.) Assume that CE 4's range $R_4$ is 9, its channel (or circuit) identifier list $D_4$[] is [107, 209, 265, 301, 414, 555, 654, 777, 888], and its label base $L_4$ is 4000. Since the customer edge devices CE 0 and CE 4 have different identifiers (i.e., 0 and 4) the processing continues. (Recall, e.g., 1518 of FIG. 15.) To reiterate, this check ensures that the addressing information does not conflict within the VPN.

Since CE 4's identifier is less than CE 0's range $R_0$ (i.e., 4<10), and since CE 0's identifier is less than CE 4's range $R_4$ (i.e., 0<9), the processing continues. (Recall, e.g., 1522 and 1524 of FIG. 15.) To reiterate, this check ensures that enough channel (or circuit) identifiers have been preprovisioned.

The service provider edge device PE 2 212*c* may then look for the appropriate outer label to get to PE 0 212*a* (Recall, e.g., 1044 of FIG. 10 and 1528 of FIG. 15.) Assume that the outer label is 10001.

The channel (or circuit) identifier that the customer edge device CE 4 will use to talk to CE0 is D4[0] (i.e., 107). The inner label for sending packets to CE0 is CE 0's label base+CE 4's ID (i.e., 1000+4=1004). The inner label on which to expect packets from CE0 is CE 4's label base+CE 0's ID (i.e., 4000+0=4000). (Recall, e.g., 1530 and 1531 of FIG. 15.)

The service provider edge device PE 2 212*c* may then install a "route" or "connection" such that packets from CE 4 with channel (or circuit) identifier 107 will be sent with outer label 10001 and inner label 1004. (Recall, e.g., 1534 of FIG. 15.) PE 2 212*c* may also install a "route" or "connection" such that packets received with label 4000 will be mapped to the channel (or circuit) identifier 107 and be sent to CE 4. (Recall, e.g., 1536 of FIG. 15.) Finally, the channel (or circuit) identifier 107 to CE 4 may be activated. (Recall, e.g., 1538 of FIG. 15.)

Since CE 5 is also attached to PE 2, PE 2 needs to do processing similar to the above for CE 5.

Similarly, when PE 0 receives an advertisement from PE 2 for VPN1, it processes the advertisement for CE 0 (and CE 1, which is also in VPN 1). Assume that CE 4 has a range $R_4$=9, and a label base $L_4$=4000. This transmission is depicted by communication 1820 of FIG. 18.

First, it 212*a* may lookup the configuration information associated with CE 0. (Recall e.g. 1510 of FIG. 15 and 1020 of FIG. 10.) In this example, it is assumed that the advertised encapsulation type matches the configured encapsulation type (e.g., both are Frame Relay), so it 212*a* proceeds. (Recall 1512 of FIG. 15, 1028 of FIG. 10, 1310 of FIG. 13 and 1420 of FIG. 14.)

Assume that CE 0's range $R_0$ is 10, its channel (or circuit) identifier list $D_0$[] is [100, 101, 102, 103, 104, 105, 106, 107, 108, 109], and its label base $L_0$ is 1000. Since the customer edge devices CE 0 and CE 4 have different identifiers (i.e., 0 and 4) the processing continues. (Recall, e.g., 1518 of FIG. 15.) To reiterate, this check ensures that the addressing information does not conflict within the VPN.

Since CE 4's identifier is less than CE 0's range $R_0$ (i.e., 4<10), and since CE 0's identifier is less than CE 4's range $R_4$ (i.e., 0<9), the processing continues. (Recall, e.g., 1522 and 1524 of FIG. 15.) To reiterate, this check ensures that enough channel (or circuit) identifiers have been preprovisioned.

The service provider edge device PE 0 212*a* may then look for the appropriate outer label to get to PE 2 212*c* (Recall, e.g., 1044 of FIG. 10 and 1528 of FIG. 15.) Assume that the outer label is 9999.

The channel (or circuit) identifier that the customer edge device CE 0 will use to talk to CE 4 is $D_0$[4] (i.e., 104). The inner label for sending packets to CE 4 is CE 4's label base+CE 0's ID (i.e., 4000+0=4000). The inner label on which to expect packets from CE 4 is CE 0's label base+CE 4's ID (i.e., 1000+4=1004). (Recall, e.g., 1530 and 1531 of FIG. 15.)

The service provider edge device PE 0 212*a* may then install a "route" or "connection" such that packets from CE 0 with channel (or circuit) identifier 104 will be sent with outer label 9999 and inner label 4000. (Recall, e.g., 1534 of FIG. 15.) PE 0 212*a* may also install a "route" or "connection" such that packets received with label 1004 will be mapped to the channel (or circuit) identifier 104 and be sent to CE 0. (Recall, e.g., 1536 of FIG. 15.) Finally, the channel (or circuit) identifier 104 to CE0 may be activated. (Recall, e.g., 1538 of FIG. 15.)

Note that the inner label of 4000 computed by PE 0, for sending packets from CE 0 to CE 4 is the same as what PE 2 computed as the incoming label for receiving packets originated at CE 0 and destined to CE 4. Similarly, the inner label of 1004, computed by PE 0, for receiving packets from CE 4 to CE 0 is same as what PE 2 computed as the outgoing label for sending packets originated at CE 4 and destined to CE 0.

§4.5 CONCLUSIONS

As can be appreciated from the foregoing detailed description, the present invention supports VPN services by using channel (or circuit) identifiers. Configuration is purely a local matter, assuming that adequate channel (or circuit) identifiers have been preprovisioned, and that customer edge devices of a given VPN don't use overlapping address space.

Further, only a single advertisement (or if multiple ads are used, they may all have the same content, at least as far as their label base and CE identifier) is needed. Thus, for example, even if 20 DLCIs would be needed for a new CE to communicate with 20 other CEs in a given VPN, only one advertisement is needed. This fact (i) makes the advertisement well suited for broadcast or multicast, (ii) reduces the control information exchange and the size of the routing table at each PE, (iii) simplifies state information used when generating advertisements, and (iv) reduces the number of advertisements stored in the routing information base of certain devices (e.g., a route reflector in a network running IBGP as its exterior gateway protocol).

Known protocols can be adapted or extended to signal configuration information. Further, addressing within the transport network is isolated from that in customer networks.

Such isolation advantageously protects the service provider from a malicious and/or incompetent customer, and also reduces the number of routes that need to be stored, thereby offering better scalability. Service provider and customer responsibilities may be clearly demarcated.

What is claimed is:

1. A method for processing ingress data received by an edge device of a transport network from a local source customer edge device to be sent to a destination customer edge device, the ingress data belonging to a virtual private network having multiple channels corresponding to multiple customer edge devices, the method comprising:
   a) determining both a first label and a second label using a channel identifier of the ingress data, the channel identifier identifying one of a first plurality of channels associated with the virtual private network;
   b) adding the first and second labels to the data to generate modified data; and
   c) using the first label to forward the modified data towards an egress edge device of the transport network,
      wherein the second label is to be used by the egress edge device to associate the ingress data with both a destination device and one of a second plurality of channels associated with the virtual private network, and
      wherein the source customer edge device communicates with the destination customer edge device using a different channel identifier than the channel identifier used by the destination customer edge device to communicate to the source customer edge device, thereby decoupling the channel identifiers used by the source and destination customer edge devices.

2. The method of claim 1 further comprising:
   a1) removing layer 2 destination address information included in the ingress data.

3. The method of claim 1 further comprising:
   b1) encapsulating the modified data.

4. The method of claim 1 wherein the channel identifier is uniquely associated with the virtual private network.

5. The method of claim 4 wherein the channel identifier and the virtual private network are used to determine the egress edge device associated with the first label.

6. The method of claim 4 wherein the channel identifier and the virtual private network are used to determine the destination device and channel associated with the second label.

7. The method of claim 6 wherein the second label and the advertisement of the egress edge device are used to determine the channel to the destination device.

8. A method for processing egress data, having a first label and a second label and having originated at a source customer edge device, by an edge device of a transport network, the egress data belonging to a virtual private network having multiple channels, the method comprising:
   a) determining one of a plurality of channels associated with the virtual private network to a destination customer edge device based on the second label;
   b) forwarding the egress data on the one channel determined,
      wherein the second label was derived from an identifier of the destination customer edge device and a label base of the source customer edge device,
      wherein the source customer edge device communicates with the destination customer edge device using a different channel identifier than the channel identifier used by the destination customer edge device to communicate to the source customer edge device, thereby decoupling the channel identifiers used by the source and destination customer edge devices.

9. The method of claim 8 wherein the second label was mapped from a channel identifier for the destination customer edge device used by the source customer edge device.

10. The method of claim 9 wherein the channel identifiers for the destination customer devices used by the source customer edge device and the destination customer edge device are different.

11. A device for use at the edge of a layer 2 transport network, the device comprising:
   a) a storage facility for storing
      i) a first route mapping a channel identifier used by a local source customer edge device and corresponding to a destination customer edge device to both (1) a first label for forwarding data to a proper egress service provider edge device and (2) a second label for forwarding data from the proper egress service provider edge device to the destination customer edge device, and
      ii) a second route mapping an ingress second label to a channel identifier associated with the local source customer edge device; and
   b) a forwarding facility for
      i) forwarding ingress data to the proper egress service provider edge device based on the first route, and
      ii) forwarding egress data to the destination customer edge device based on the second route,
   wherein the ingress data belongs to a virtual private network having a plurality of channels, and
   wherein the source customer edge device communicates with the destination customer edge device using a different channel identifier than the channel identifier used by the destination customer edge device to communicate to the source customer edge device, thereby decoupling the channel identifiers used by the source and destination customer edge devices.

12. The device of claim 11 further comprising:
   c) a configuration facility for determining the first and second routes stored in the storage facility based on received advertisements about newly added customer edge devices.

13. The device of claim 11 further comprising:
   c) a signaling facility for signaling information about a newly added customer edge device coupled with the device, to other devices at the edge of the layer 2 transport network.

14. A layer 2 transport network for use by a source customer edge device and a destination customer edge device, both belonging to a same virtual private network, the source customer edge device having a list of channel identifiers for each customer edge device of the virtual private network, the layer 2 network comprising:
   a) a first transport network edge device, the first transport network edge device coupled with the source customer edge device and having
      i) a storage facility for storing a first route mapping a first channel identifier, used by the source customer edge device and corresponding to the destination customer edge device, to both (1) a first label for forwarding data to a second transport network edge device and (2) a second label associated with the destination customer edge device, and
      ii) a forwarding facility for forwarding data addressed to the destination customer edge device to the second transport network edge device based on the first label of the first route; and b) the second transport network edge device, the second transport network edge device coupled with the destination edge device and having
  i) a storage facility for storing a second route mapping the second label to a second channel identifier associated with the destination customer edge device; and
  ii) a forwarding facility for forwarding the data to the destination customer edge device based on the second channel identifier of the second route, wherein each of the first channel identifier and the second channel identifier is associated with the destination customer edge device, and wherein the first channel identifier is different from the second channel identifier.

* * * * *